US009787350B2

(12) United States Patent
Boni et al.

(10) Patent No.: US 9,787,350 B2
(45) Date of Patent: Oct. 10, 2017

(54) ELECTRONIC DEVICE AND SYSTEM FOR THE POINT-MULTIPOINT TRANSMISSION OF A DIGITAL SIGNAL OVER A RADIO COMMUNICATION NETWORK

(71) Applicant: BLUEGAN S.R.L., Reggio Emilia (IT)

(72) Inventors: Angelo Boni, Reggio Emilia (IT); Fabrizio Pancaldi, San Cesario sul Panaro (IT); Marco Bettoli, Castellarano (IT)

(73) Assignee: BLUEGAN S.R.L., Reggio Emilia (IT)

( * ) Notice: Subject to any disclaimer, the term of this patent is extended or adjusted under 35 U.S.C. 154(b) by 0 days.

(21) Appl. No.: 14/909,535

(22) PCT Filed: Feb. 20, 2014

(86) PCT No.: PCT/IB2014/059115
§ 371 (c)(1),
(2) Date: Feb. 2, 2016

(87) PCT Pub. No.: WO2015/015322
PCT Pub. Date: Feb. 5, 2015

(65) Prior Publication Data
US 2016/0197639 A1   Jul. 7, 2016

(30) Foreign Application Priority Data
Aug. 2, 2013   (IT) .............................. MI2013A1310

(51) Int. Cl.
*H04B 1/40*   (2015.01)
*H04W 4/18*   (2009.01)
(Continued)

(52) U.S. Cl.
CPC .............. *H04B 1/40* (2013.01); *H04B 7/024* (2013.01); *H04H 20/06* (2013.01); *H04H 20/62* (2013.01);
(Continued)

(58) Field of Classification Search
CPC ..... H04W 84/18; H04W 84/10; H04W 88/04; H04W 28/14; H04W 36/02; H04W 92/18;
(Continued)

(56) References Cited

U.S. PATENT DOCUMENTS 7,336,924 B2    2/2008  Ami et al.
8,660,055 B2 *  2/2014  Ueda ...................... H04B 1/385
                                                       370/315

(Continued)

FOREIGN PATENT DOCUMENTS

EP    1185012 A2    3/2002
EP    2168247 A1    3/2010
(Continued)

OTHER PUBLICATIONS

Ergen, M., "WTRP—Wireless Token Ring Protocol", Berkley, California, XP055139571, Jan. 1, 2002, pp. 1-127.
(Continued)

*Primary Examiner* — Michelle M Koeth
(74) *Attorney, Agent, or Firm* — Pearne & Gordon LLP

(57) ABSTRACT

An electronic device for point-to-multipoint transmission of a digital signal over a radio communication network includes a transmitter-receiver configured to receive a radio-frequency input digital signal and generate therefrom a baseband digital signal and includes a digital signal processor. The digital signal processor includes a receiving module, an input buffer, an audio decoder module and an output buffer. The transmitter-receiver is further configured to receive the duplicated baseband output digital signal and generate therefrom a radio-frequency output digital signal. The transmitter-receiver is configured to receive the radio-frequency input digital signal on the basis of Bluetooth® specifications and transmit the radio-frequency output digital signal on the basis of Bluetooth® specifications, and the
(Continued)

microcontroller is configured to realize a unidirectional asynchronous packet data link. There is further described a system for point-to-multipoint radio transmission including a plurality of electronic devices for point-to-multipoint transmission of a digital signal over a radio communication network.

20 Claims, 17 Drawing Sheets

(51) Int. Cl.
H04W 8/00 (2009.01)
H04W 72/12 (2009.01)
H04W 88/06 (2009.01)
H04H 20/06 (2008.01)
H04H 20/62 (2008.01)
H04H 60/79 (2008.01)
H04B 7/024 (2017.01)
H04W 4/00 (2009.01)
H04W 92/18 (2009.01)
H04M 1/60 (2006.01)

(52) U.S. Cl.
CPC ............ *H04H 60/79* (2013.01); *H04W 4/008* (2013.01); *H04W 4/18* (2013.01); *H04W 8/005* (2013.01); *H04W 72/1215* (2013.01); *H04W 88/06* (2013.01); *H04M 1/6066* (2013.01); *H04W 92/18* (2013.01)

(58) Field of Classification Search
CPC ....... H04W 4/008; H04W 4/18; H04W 8/005; H04W 72/1215; H04W 88/06; H04M 1/6066; H04M 1/7253; H04M 1/04; H04M 2250/02; H04R 3/12; H04B 1/40; H04B 7/024; H04H 20/06; H04H 20/62; H04H 60/79

See application file for complete search history.

(56) References Cited

U.S. PATENT DOCUMENTS

| 2002/0028658 | A1  | 3/2002 | Ami et al. | |
|---|---|---|---|---|
| 2007/0160225 | A1* | 7/2007 | Seydoux | H04W 8/005 |
| | | | | 381/79 |
| 2008/0144645 | A1* | 6/2008 | Russell | H04L 47/10 |
| | | | | 370/412 |
| 2009/0017868 | A1* | 1/2009 | Ueda | H04B 1/3877 |
| | | | | 455/557 |
| 2012/0057518 | A1  | 3/2012 | Herrala et al. | |

FOREIGN PATENT DOCUMENTS

| EP | 2400812 A1 | 12/2011 |
|---|---|---|
| EP | 2458931 A1 | 5/2012 |

OTHER PUBLICATIONS

Cheng, Y., et al., "A Modified Wireless Token Ring Protocol to Prevent Data Collision in Wireless Traffic Sensors", University of Cincinnati, XP055139531, Feb. 28, 2006, pp. 1-129.

Petrioli, C., et al., "Configuring BlueStars: Multihop Scattemet Formation for Bluetooth Networks", IEEE Transactions on Computers, IEEE Service Center, Los Alamitos, California, vol. 52, No. 6, Jun. 2003, pp. 779-790.

* cited by examiner

ELECTRONIC DEVICE AND SYSTEM FOR THE POINT-MULTIPOINT TRANSMISSION OF A DIGITAL SIGNAL OVER A RADIO COMMUNICATION NETWORK

TECHNICAL FIELD

The present invention relates to an electronic device for point-to-multipoint transmission of a digital signal over a short-range radio communication network.

In particular, the present invention relates to an electronic device for point-to-multipoint transmission of a digital signal over a radio communication network using Bluetooth® technology.

The invention further relates to a point-to-multipoint radio transmission system comprising at least three of the aforesaid electronic devices.

BACKGROUND ART

The Bluetooth® standard is well known in telecommunications; it is a technical/industrial data transmission standard for wireless personal area networks (WPANs) which enables information to be exchanged among different devices via a secure short-range radio frequency.

Bluetooth® looks for devices covered by the radio signal within a range of a few dozen meters and puts them into communication with one another. These devices can be, for example, palmtops, mobile phones, personal and portable computers, printers, digital cameras and video game consoles, provided that they have the specific hardware and software required by the standard itself.

The Bluetooth® specification was developed by Ericsson and later formalized by the Bluetooth® Special Interest Group (SIG). The SIG, whose establishment was formally announced on 20 May 1999, is an association made up of Sony Ericsson, IBM, Intel, Toshiba, Nokia and other companies that have been added as associates or additional members.

Bluetooth® technology has been widely disseminated in the market for short-range radio links thanks to its universal character and user friendliness. Two devices that use Bluetooth® technology can be connected to each other in just a few seconds, in any part of the world. Interphones are known which use Bluetooth® technology to establish voice communication between two users, who can be stationary (for example, on a worksite) or in reciprocal motion, for example, two athletes, two cyclists or two motorcyclists. In the case of two motorcyclists, the interphones are installed in protective motorcycle helmets: by means of an interphone a motorcycle rider can communicate by voice with the passenger on the same motorcycle or with the rider (or passenger) on another motorcycle without using connection cables between the two helmets, given that communication takes place via a radio channel. It is well known that prior art Bluetooth® devices have the following disadvantages:

they enable a point-to-point link between two users (for example, between the rider of one motorcycle and the rider of another motorcycle) over a maximum distance of 1 Km, whereas in the case of a point-to-multipoint link (three users at most) the maximum distance is considerably reduced (typically to a few dozen meters);
  they do not enable a point-to-multipoint link to be established with more than three users simultaneously;
  they do not enable unidirectional communication to be established with more than three users.

Patent EP 1185012 describes a multipoint transmission system which uses a Bluetooth® radio communication network. Said transmission system enables a point-to-multipoint link to be established with a larger number of devices than is possible with Bluetooth® technology (that is, more than eight). This is achieved by using an additional device O (see FIGS. 1 and 3), which enables reception information (for example, the address of the Bluetooth® device known as BD_ADDR and the clock signal) to be exchanged between a Bluetooth® transmission device T and a Bluetooth® reception device R. The connections between the additional device O and the transmission device T and between the additional device O and the reception device R comply with Bluetooth® specifications, whilst the link between the transmission device T and reception device R use a specific protocol and thus do not comply with Bluetooth® specifications (see par. 46).

Document US 2009/0017868 of the Bose Corporation describes a point-to-point wireless audio transmission.

In paragraph 2, this document cites Bluetooth® technology as an example of point-to-point wireless audio transmission.

In paragraph 47, the document very generically states that a processor of a device can establish a point-to-point link to another device in order to transmit an audio signal.

In paragraph 46, the document states that the same processor can store the audio signal in order then to transmit it.

The undersigned is of the opinion that, generally speaking, the document does not address the real problems of transmitting and retransmitting an audio signal, in particular with reference to the Bluetooth® standard, nor, consequently, does it provide teachings for overcoming them; for example, the document does not explain the type of link (synchronous or asynchronous) which would hypothetically be used to achieve the presumed functions.

The undersigned is of the opinion that the cited document does not contain sufficient teachings to enable the person skilled in the art to implement the invention described.

As partial confirmation of this, the application appears to have been abandoned along with the corresponding European patent application EP2168247.

The undersigned intends to better clarify these affirmations by explaining
  1) what types of Bluetooth® links are known;
  2) what problems of such links are known;
  1) Bluetooth® Links Bluetooth® technology defines two types of links supporting voice and data transfer applications: an asynchronous connectionless (ACL) service and a synchronous connection-oriented (SCO) service.

The ACL link supports data traffic and is based on a best-effort type of service. The information conveyed can be of a user or control type.

The SCO link, on the other hand, is a link that supports links with real-time and multimedia traffic.

The ACL link supports packet-switched connections, point-to-multipoint connections and symmetrical or asymmetrical connections.

The SCO link envisages circuit-switched connections, point-to-point connections and symmetrical connections. This type of link is generally used to carry voice over 64 kbit/s channels. The master can support up to three SCO links to the same slave or different slaves belonging to the same piconet. A slave, on the other hand, can support up to three SCO links to the same master, or two if the links were created by different masters. Type of network Two or more devices connected together form a piconet. The devices within a piconet can be one of two types: master or slave. The master is the device which, within a piconet, takes care of everything concerning the synchronization of the clock of the other devices (slaves) and the sequence of frequency jumps. The slaves are units of the piconet which are synchronized with the clock of the master and with the frequency channel.

Bluetooth specifications envisage 3 types of topologies: point-to-point, point-to-multipoint and scatternet.

Various piconets can be connected together in a topology called scatternet.

2) Problems of Links with Bluetooth®

2.1) Synchronous Link Between Devices (SCO)

It is well known that scatternets with SCO-type data links display problems in terms of maintaining signal quality due to sensitivity to the delay in the packets transmitted; in particular, this problem is clearly apparent even with 3 or 4 devices connected in a chain via an SCO link.

The problem is described in the document CSR BlueCore Scatternet Support, August 2005 (www.csr.com)—(issued under an NDA).

The same problem is highlighted in the document Scatternet—Part 1—Baseband vs. Host Stack Implementation, Ericsson Technology, June 2004.

In short, what is expressed in the two cited documents can be summarized with reference to FIG. 6 in which reference is made, in particular, to devices (in particular, four devices) connected in a chain (or daisy chain).

Connecting different devices in a daisy chain makes it possible to create a scatternet, since each intermediate device supports two distinct connections and thus carries out a master-slave role switch. Supposing that we have a chain made up of 4 devices connected as shown in FIG. 6; the second device is a slave in the connection with the first one, but is also the master in the connection with the third. The third device in turn has the role of a slave in the connection with the second one and the role of master in the connection with the fourth.

The connections among the various devices are standard Bluetooth® audio links of the SCO (synchronous connection-oriented) type. Therefore D1 has one SCO connection with D2, D2 has 2 SCO connections, the first with D1 and the second with D3; D3 is connected with D2 and with D4; and, finally, D4 has 1 SCO connection with D3.

Tests Performed

Tests were performed in an open space using 4 devices with firmware modified in such a way as to establish a double SCO connection:
  using 3 devices connected in a daisy chain, some audio disturbances were detected when a distance of about 100 meters was reached between one device and another.
  with 4 devices connected in a daisy chain, disturbances were detected even at a smaller distance, variably influenced by the direction of the antenna of each device.

When the audio signal was analysed using an oscilloscope, various interruptions lasting a few milliseconds were identified; these were due to the insufficient bandwidth. Different configurations of the power table (which enables different levels of transmission power to be set) of the devices were tested to assess the reachable distance, but the disturbances were not eliminated.

In short, there is no known solution which enables more than three devices to be connected simultaneously while increasing the maximum allowed distance.

Document US 2009/0017868 of the Bose Corporation does not suggest any solutions for the highlighted problems in the synchronous link (SCO), nor does it suggest an implementation enabling more than three devices to be simultaneously connected via an asynchronous link (ACL) while increasing the maximum distance allowed.

BRIEF SUMMARY OF THE INVENTION

The present invention relates to an electronic device for point-to-multipoint transmission of a digital signal over a radio communication network, as defined in the appended claim 1 as filed and the preferred embodiments thereof described in the dependent claims 2 to 6 as filed.

The Applicant has perceived that the electronic device according to the present invention has the advantage of increasing the maximum distance allowed for a point-to-multipoint radio link with three or more electronic devices simultaneously (for example, voice communication among three or more people); in particular, the maximum distance ranges between about 1,000 and 3,000 meters.

In other words, the electronic device of the invention makes it possible both to increase the number of electronic devices connected via a point-to-multipoint radio link, and to increase the maximum distance allowed for a point-to-multipoint radio link.

The present invention also relates to an interphone for protective helmets for users of vehicles as defined in the appended claim 7 as filed.

The present invention also relates to a point-to-multipoint system for transmitting a digital signal over a radio communication network as defined in the appended claim 8 as filed and the preferred embodiments thereof described in the dependent claims 9 to 25 as filed.

The system according to the invention exploits asynchronous packet data links, ensuring the following technical effects:
  the signal can also be transmitted among three or more electronic devices;
  the electronic devices are dynamically configurable as masters or slaves based on an activation signal;
  increase in the maximum distance allowed for a point-to-multipoint radio link with three or more electronic devices simultaneously (for example, voice communication among three or more people); in particular, the maximum distance ranges between about 1,000 and 3,000 meters.

In other words, the system of the invention makes it possible both to increase the number of electronic devices connected via a point-to-multipoint radio link, and to increase the maximum distance allowed for a point-to-multipoint radio link, as well as making the system more easily and dynamically configurable according to the specific topology of the connection that can be achieved.

Preferred embodiments of the system of claim 8 as filed are described in the dependent claims 9 to 25 as filed.

The present invention also relates to a protocol for setting up a connection scheme among electronic devices, as defined in claims 1 to 6 as filed, in a transmission system as defined in claims 8 to 25 as filed.

The present invention also relates to a protocol for reserving a voice call in a connection scheme among electronic devices as defined in claims 1 to 6 as filed in the transmission system as defined in claims 8 to 25 as filed.

BRIEF DESCRIPTION OF THE DRAWINGS

Additional features and advantages of the invention will be apparent from the description which follows of a preferred embodiment and variants thereof, provided by way of example with reference to the appended drawings, in which.

DETAILED DESCRIPTION OF THE INVENTION

Figure 1:
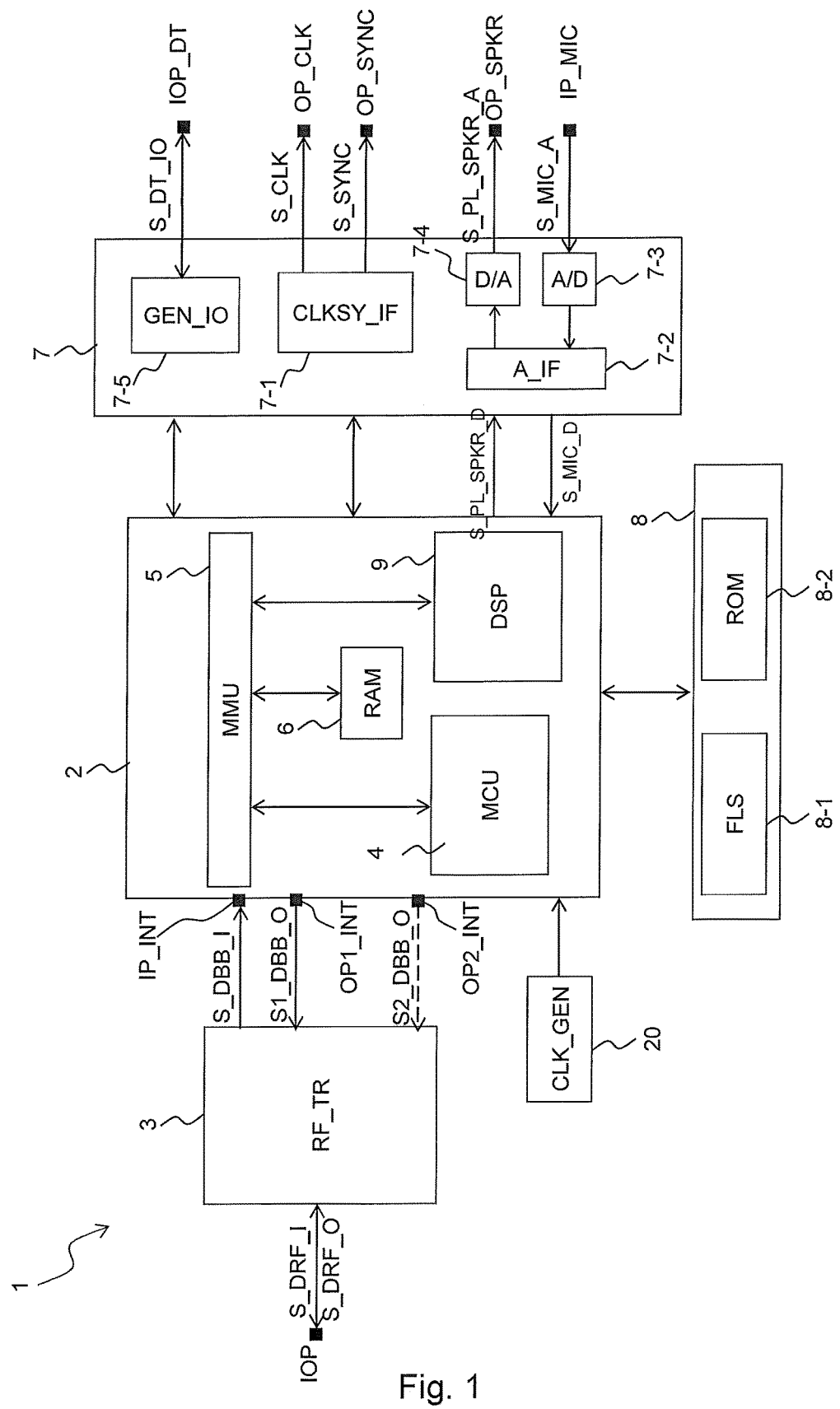
FIG. 1 schematically shows a block diagram of an electronic device for point-to-multipoint transmission of a digital signal over a short-range radio communication network according to one embodiment of the invention.

With reference to FIG. 1, there is shown an electronic device 1 for point-to-multipoint transmission of a digital signal over a short-range radio communication network. The digital signal can be of an audio type or data type, e.g. images or videos.

The term "short-range" means that the distance between the electronic devices (analogous to the electronic device 1) in the radio communication network is less than 2,000 meters.

For the sake of simplicity, in order to explain the invention we shall consider hereunder a case in which the digital signal is of an audio type: in this case, the electronic device 1 enables voice communication to be established with a plurality (in particular, three or more) of electronic devices analogous to the electronic device 1, as will be explained in greater detail below.

The electronic device 1 comprises:
- an input/output data terminal IOP for receiving a radio-frequency input data signal S_DRF_I and for transmitting a first radio-frequency output data signal S_DRF_O;
- an output audio terminal OP_SPKR for generating an analog audio driving signal S_PL_SPKR_A;
- an input audio terminal IP_MIC for receiving an input analog audio signal S_MIC_A;
- a transmitter-receiver 3;
- a processing module 2;
- a generator 20 of a clock signal S_CLK;
- an input/output interface 7;
- an interface for memories 8.

Preferably, the electronic device 1 further comprises an output clock terminal OP_CLK for generating a clock signal S_CLK and an output synchronization terminal OP_SYNC for generating a synchronization signal S_SYNC.

The input/output data terminal IOP is connected with a receiving/transmitting antenna.

The output audio terminal OP_SPKR is connected with an audio distribution device, such as, for example, headphones or speakers.

The audio input terminal IP_MIC is connected to a microphone.

Preferably, the input/output interface 7 further comprises an input/output terminal IOP_DT for transmitting/receiving a data signal S_DT_IO which carries generic data, videos or images (for example, by means of the USB protocol), so that they can be displayed on a screen, for example an LCD screen.

We observe that, for the sake of simplicity, the power components and auxiliary components are not shown in FIG. 1.

The transmitter-receiver 3 is such as to transmit (by means of the input/output data terminal IOP), over a radio communication (i.e. wireless) channel, the first radio-frequency output data signal S_DRF_O, which carries a digital audio signal and is such as to receive (by means of the input/output data terminal IOP), from the radio communication channel, the radio-frequency input data signal S_DRF_I, which carries a digital audio signal. This is obtained by means of time division multiple access (TDMA). Advantageously, according to the invention, the digital audio signal is carried over the radio communication channel based on an asynchronous packet data link; in particular, according to the invention, the data link is realized using Bluetooth® technology with a unidirectional asynchronous connectionless link (ACL) for packet data.

The technical effect is represented by an improved efficiency in the use of the available bandwidth; this enables the electronic device 1 to establish communication with three or more electronic devices (for example, eight or more) analogous to the electronic device 1, as will be explained in greater detail below in the description of FIGS. 4A-4F.

In other words, the technical effect ensured by the envisaged solution is a use of fewer resources necessary for transmission.

In other words, both the hardware and software resources are optimized, thus guaranteeing sufficient resources to enable audio signals to be transmitted even to many (at least three) devices connected according to the various topologies that will be shown in the course of the present description.

The transmitter-receiver 3 is such as to receive the radio-frequency input data signal S_DRF_I from the input/output data terminal IOP, is such as to perform a demodulation of the radio-frequency input data signal S_DRF_I from the radio frequencies into a baseband input data signal S_DBB_I at the baseband frequencies, and is such as to generate the baseband input data signal S_DBB_I.

Moreover, the transmitter-receiver 3 is such as to receive a first baseband output data signal S1_DBB_O, is such as to perform a modulation of the first baseband output data signal S1_DBB_O into the first radio-frequency output data signal S_DRF_O, and is such as to generate the first radio-frequency output data signal S_DRF_O over the input/output data terminal IOP.

Therefore, the baseband input data signal S_DBB_I and the first baseband output data signal S1_DBB_O carry a digital audio signal in the baseband frequencies.

According to a first variant of the invention, the electronic device 1 is such as to transmit a second radio-frequency output data signal S2_DRF_O over the input/output data terminal IOP by means of time division multiple access.

The transmitter-receiver 3 is such as to operate according to Bluetooth® specifications, as defined by the Bluetooth Special Interest Group (commonly abbreviated as "SIG"), in particular based on the specification version 2.0 or higher. In this case, the frequencies used for the radio channel are in the range of between 2.4 Ghz and 2.48 Ghz and the transmitter-receiver 3 is such as to perform the lower functions of the Bluetooth® stack, namely, the physical layer and processing of the radio-frequency signal received from the radio communication channel and the conversion thereof into baseband (and vice versa). As already said, advantageously, according to the invention, the asynchronous non-connection-oriented data link which carries the digital audio signal is of the ACL (asynchronous connectionless) type.

The processing module 2 has the function of receiving and processing the baseband input data signal S_DBB_I, which carries the digital audio signal converted into baseband and the function of generating the first baseband output data signal S1_DBB_O based on the baseband input data signal S_DBB_I, as will be explained in greater detail below in the description of FIGS. 2A-2B and 3A-3B.

The input/output interface 7 has the function of connecting the processing module 2 with a microphone and with one or more audio distribution devices, such as, for example, headphones or speakers.

In particular, the input/output interface 7 comprises an analog/digital converter 7-3 for receiving, from the input audio terminal IP_MIC (connected to a microphone), the input analog audio signal S_MIC_A, which carries an analog audio signal generated by the microphone, in order to perform sampling and quantization of the input analog audio signal S_MIC_A into an input digital audio signal S_MIC_D and to transmit, to the processing module 2, the input digital audio signal S_MIC_D, which carries a sampled audio signal. Sampling is carried out, for example, by means of the PCM (Pulse Code Modulation) technique.

The input/output interface 7 further comprises a digital/analog converter 7-4 for receiving, from the processing module 2, a digital audio driving signal S_PL_SPKR_D, which carries a digital audio signal, performing a digital-to-analog conversion of the digital audio driving signal S_PL_SPKR_D into the analog audio driving signal S_PL_SPKR_A and generating the analog audio driving signal S_PL_SPKR_A on the output audio terminal OP_SPKR so as to drive an audio distribution device, such as, for example, headphones or speakers.

Preferably, the input/output interface 7 is such as to further connect the processing module 2 with one or more video display devices, such as, for example an LCD screen or LED display.

The interface for memories 8 has the function of storing (for example, by means of a Flash memory 8-1 or ROM 8-2) the software program which implements the functions executed by the processing module 8. For example, the interface for memories 8 is such as to store the functions necessary for implementing the Bluetooth® stack, i.e. the protocols LMP, L2CAP, SDP.

More in particular, the processing module 2 comprises:
a first internal data input terminal IP_INT for receiving the baseband input data signal S_DBB_I;
an internal data output terminal OP1_INT for generating the first baseband output data signal S1_DBB_O;
an input audio terminal for receiving the digital audio signal S_MIC_D;
an output audio terminal for generating the digital audio driving signal S_PL_SPKR_D;
a microcontroller 4;
a digital signal processor 9;
a memory 6;
a memory management unit 5.

The microcontroller 4 has the function of receiving and processing the baseband input data signal S_DBB_I and generating the first baseband output data signal S1_DBB_O. The microcontroller 4 is such as to perform the functions necessary for realizing an asynchronous data link between two or more electronic devices analogous to the electronic device 1. In other words, the microcontroller 4 performs the functions for establishing an asynchronous point-to-multipoint data link between the electronic device 1 and a plurality (in particular, three or more) of electronic devices analogous to the electronic device 1.

Moreover, the microcontroller 4 is such as to perform the functions necessary for establishing unidirectional voice communication between the electronic device 1 functioning as a transmitting master and a plurality (in particular, three or more) of electronic devices analogous to the electronic device 1 functioning as receiving slaves, as will be explained in greater detail below with reference to FIGS. 4A-4F.

Advantageously, according to the invention, the asynchronous data link which enables the digital audio signal to be carried is of the ACL (asynchronous connectionless) type. The term "transmitting master device" means that the device is such as to establish, during transmission, unidirectional voice communication with all the other devices (to which it is directly or indirectly connected, based on the protocol for setting up the connection scheme) functioning as receivers and indicated as "receiving slave devices". Advantageously, according to the invention, the same device can be, alternatively, a transmitting master or receiving slave, in different unidirectional voice communications, based on the reservation of the voice call as defined by the voice call reservation protocol.

Moreover, the microcontroller 4 is such as to perform the functions necessary for implementing a voice call reservation protocol, as will be explained in greater detail with reference to FIGS. 5A-5E.

For example, in the event that the transmitter-receiver 3 is such as to operate according to Bluetooth® specifications, the microcontroller 4 will carry out the part of the functions of the Bluetooth® stack (based on specification version 2.0 or higher) that are not implemented in the transmitter-receiver 3, in particular the following protocols:
link management protocol (commonly abbreviated as "LMP");
Logical Link Control and Adaptation protocol (commonly known as "L2CAP");
Service Discovery Protocol (commonly abbreviated as "SDP").

Therefore, in the case of a Bluetooth®-type transmitter-receiver 3, the asynchronous data link (which carries the digital audio signal over the radio communication channel) will be implemented with the protocol L2CAP.

The digital signal processor 9 has the following functions:
it performs a compression and decompression of the baseband digital audio signal;
it performs a duplication during reception of the compressed baseband digital audio signal;
it performs a buffering of the input and output signals;
advantageously, it performs a duplication during transmission of the compressed digital audio signal.

For example, the compression-decompression takes place based on the mp3 format (Moving Picture Experts Group-1/2 Audio Layer 3).

The digital signal processor 9 is for example a Kalimba DSP.

The memory 6 is a RAM-type memory which has the function of storing information used by the microcontroller 4 to perform calculations.

Figure 2A:
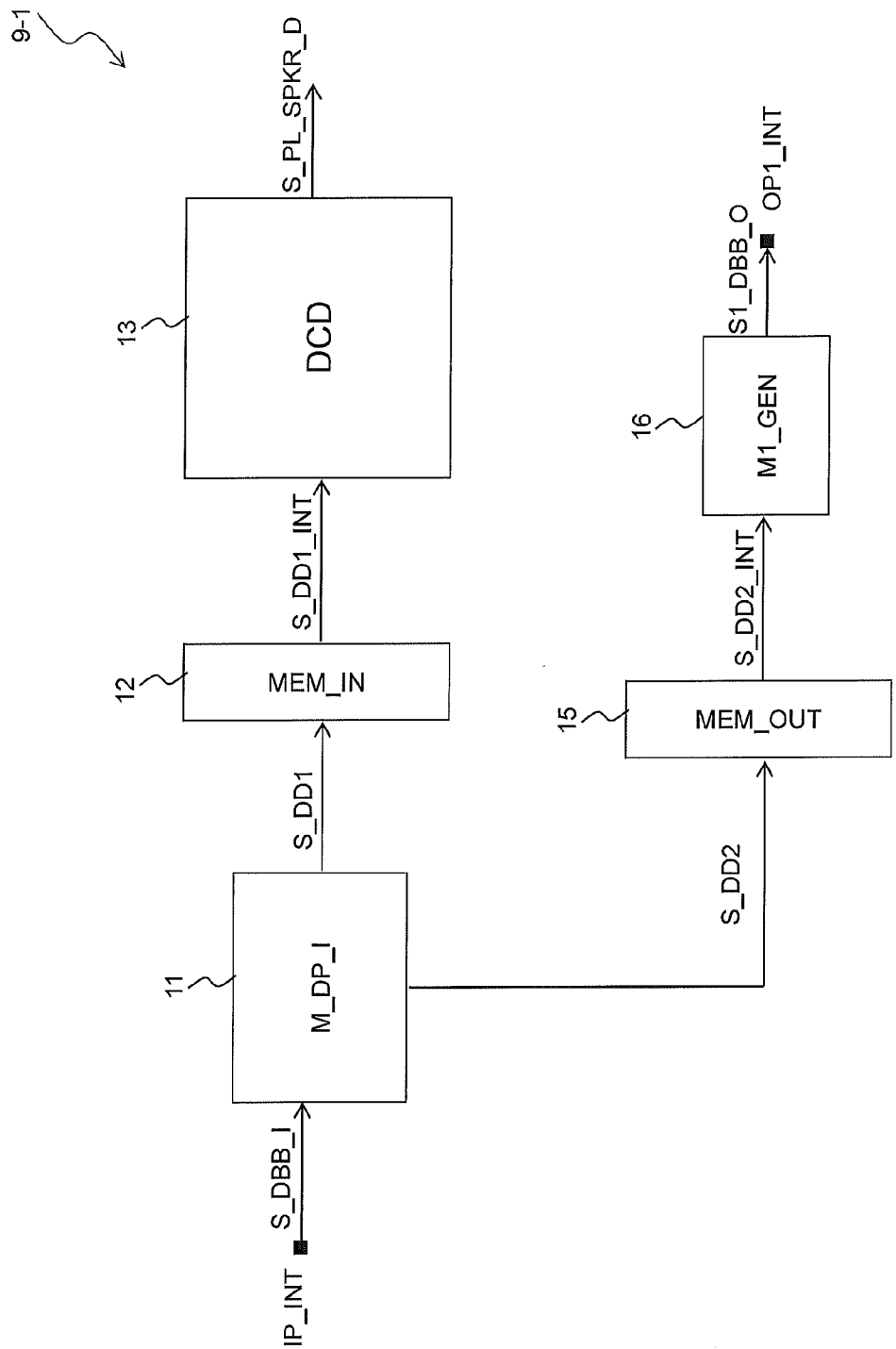
FIG. 2A schematically shows a block diagram of the receiving module of the electronic device according to the embodiment of the invention.

With reference to FIG. 2A, there is shown a block diagram of the receiving module 9-1 realized in the digital signal processor 9. The receiving module 9-1 comprises:
- an input duplication module 11;
- an input buffer 12;
- an audio decoder module 13;
- an output buffer 15;
- a generation module 16.

The input duplication module 11 has the function of duplicating the baseband input data signal S_DBB_I. In particular, the input duplication module 11 is such as to receive the baseband input data signal S_DBB_I from the internal input data terminal IP_INT and is such as to generate a first data signal S_DD1 equal to the baseband input data signal S_DBB_I and a second data signal S_DD2 equal to a copy of the baseband input data signal S_DBB_I. In this manner, the first data signal S_DD1 and the second data signal S_DD2 each carry the digital audio signal in the baseband frequencies, in particular in a compressed format.

The input buffer 12 is a circular buffer memory which has the function of maintaining an average quantity of data to be processed by the audio decoder module 13. The average quantity of data stored in the input buffer 12 ranges between a minimum level and a maximum level determined according to the size of the input buffer 12 itself.

In other words, the memory is sized so as to enable the maximum dynamics associated with the lowest latency.

In still other words, the memory is sized according to the quantity of data processed based on one or more of the following parameters:
- number of users envisaged for transmission (greater than three); average communication interval between users, statistically calculated;
- average latency in the transmission of data from the master device to the slaves.

Advantageously, according to the invention, the presence of the input buffer 12 makes it possible to obtain, starting from an asynchronous packet data transmission, a high quality pseudo-synchronous data flow (for example, of the audio type). In particular, the input buffer is such as to store the data carried by the first data signal S_DD1 and is such as to generate the first internal data signal S_DD1_INT, which carries the data read from the input buffer 12.

The audio decoder module 13 is such as to receive the data read from the input buffer 12 (i.e. the baseband input data signal S_DBB_I) and has the function of performing a decompression of the first internal data signal S_DD1_INT (and hence of the baseband input data signal S_DBB_I) in such a way as to generate decompressed digital audio data and has the function of processing the decompressed digital audio data.

In other words, the audio decoder module 13 is such as to receive the data read from the input buffer 12 and has the function of performing a decompression of the first baseband input data signal S_DBB_I.

For example, the baseband input data signal S_DBB_I is compressed on the basis of the mp3 format and the audio decoder module 13 then performs a decompression from the mp3 format to a decompressed digital audio format, for example of the PCM type. Moreover, the audio decoder module 13 is such as to generate, based on the signal of the processed digital audio data, the digital audio driving signal S_PL_SPKR_D, which carries digital audio data, in order to drive an audio distribution device.

The output buffer 15 is a circular buffer memory which has the function of storing the second data signal S_DD2, i.e. a copy of the baseband input data signal S_DBB_I. In particular, the output buffer 15 is such as to store the data carried by the second data signal S_DD2 and is such as to generate the second internal data signal S_DD2_INT, which carries the data read from the output buffer 15. The output buffer 15 is such as to store an average quantity of data ranging between a minimum level and a maximum level determined according to the size of the output buffer 15 itself. The presence of the output buffer 15 (together with the presence of the input buffer 12) makes it possible to obtain, starting from an asynchronous packet data transmission, a high quality pseudo-synchronous data flow (for example, of the audio type).

The generation module 16 is such as to receive the second internal data signal S_DD2_INT, which carries the data read from the buffer 15 (i.e. a copy of the baseband input data signal S_DBB_I) and has the function of generating, based on the second internal data signal S_DD2_INT, the first baseband output data signal S1_DBB_O, which carries a digital audio signal compressed in the baseband frequencies, on the first internal data output terminal OP1_INT.

It should be observed that the input duplication module 11 is positioned before the audio decoder module 13 and the duplication of the baseband input data signal S_DBB_I thus takes place without any decompression being performed: this enables the electronic device 1 to operate as a repeater and propagate the digital audio signal (received over the input/output data terminal IOP) to another electronic device (analogous to the electronic device 1) connected to it. This serves to increase the number of electronic devices (analogous to the device 1) among which it is possible to establish voice communication and, moreover, it increases the maximum tolerable distance between said electronic devices, reaching as far as a distance in the range of between 1,000 and 3,000 meters.

It should be observed that the input duplication module 11, the audio decoder module 13 and the generation module 16 are realized by means of a digital signal processor, and the input buffer 12 and output buffer 15 are likewise internal to the digital signal processor 9.

Figure 2B:
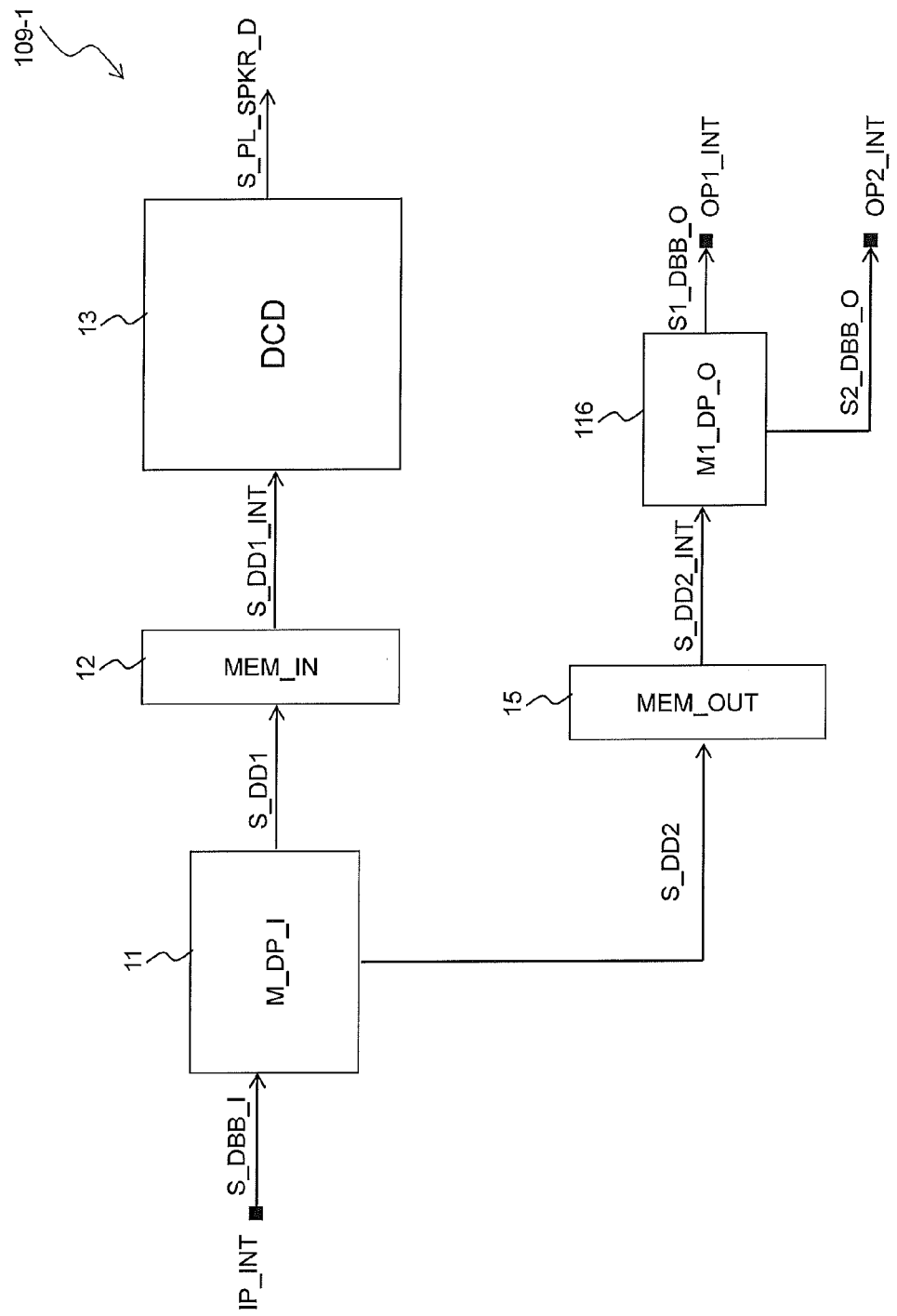
FIG. 2B schematically shows a block diagram of a variant of the receiving module of the electronic device according to the embodiment of the invention.

With reference to FIG. 2B, there is shown a block diagram of the receiving module 109-1 realized in the digital signal processor 9 according to one variant of the embodiment of the invention.

The receiving module 109-1 differs from the receiving module 9-1 due to the presence of a second internal output data terminal OP2_INT and an output duplication module 116 having the function of duplicating the second internal data signal S_DD2_INT on the second internal output data terminal OP2_INT. In particular, the output duplication module 116 is such as to receive the second internal data signal S_DD2_INT and is such as to generate, on the first internal output data terminal OP1_INT, the first baseband output data signal S1_DBB_O, which is equal to the second internal data signal S_DD2_INT, and is such as to generate, on the second internal output data terminal OP2_INT, a second baseband output data signal S2_DBB_O, which is equal to a copy of the second internal data signal S_DD2_INT.

In this manner, the electronic device 1 according to the first variant of the invention is capable of propagating the digital audio signal to two electronic devices (analogous to the electronic device 1) connected to it, enabling the connection of a plurality of electronic devices according to a tree scheme, as will be explained in greater detail below with reference to FIG. 4B.

Figure 3A:
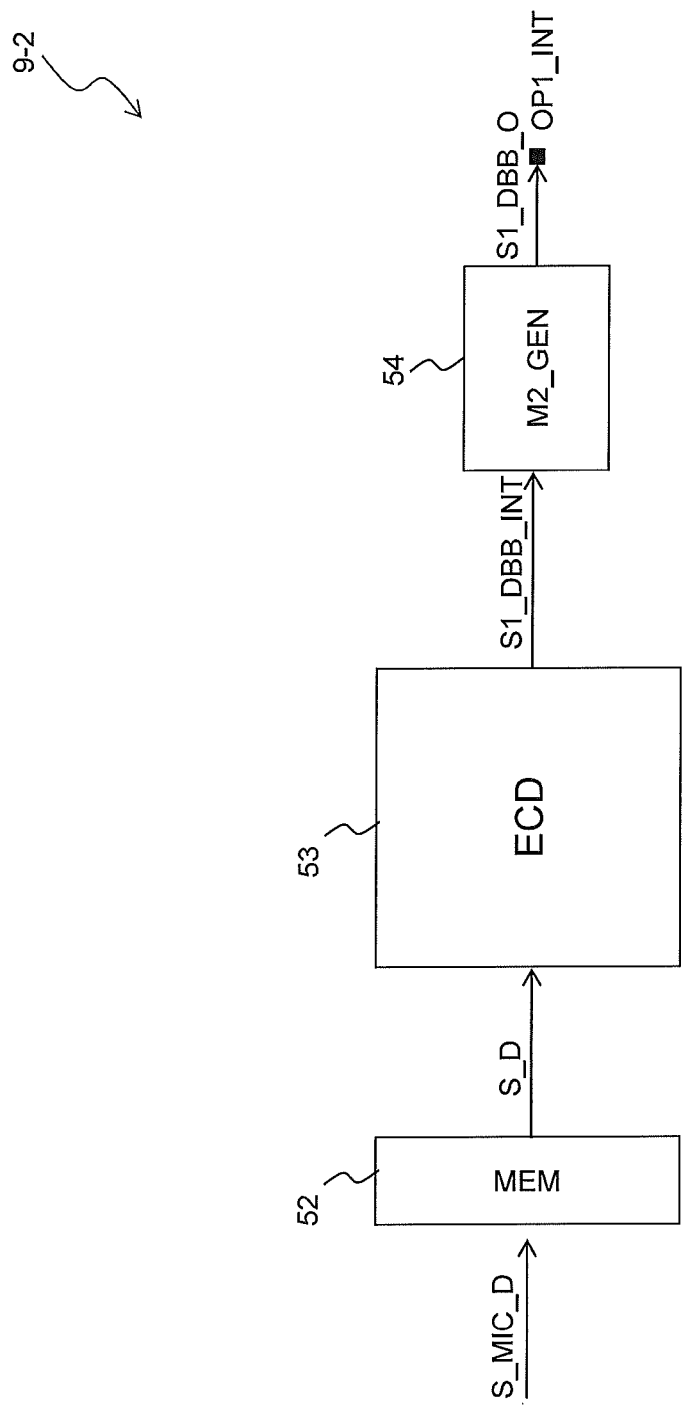
FIG. 3A schematically shows a block diagram of the transmission module of the electronic device according to the embodiment of the invention.

With reference to FIG. 3A, there is shown a block diagram of the transmission module 9-2 realized in the digital signal processor 9. The receiving module 9-2 comprises:
- a buffer 52;
- an audio encoder module 53;
- a transmission module 54.

The buffer 52 is a circular buffer memory which is such as to store the input digital audio signal S_MIC_D and is such as to generate an output data signal S_D, which carries the data read from the buffer 52. The buffer 52 is such as to store an average quantity of data ranging between a minimum level and a maximum level determined according to the size of the buffer 52 itself. The presence of the buffer 52 (together with the presence of the input buffer 12 and the output buffer of the receiving module 9-1) makes it possible to obtain, starting from an asynchronous packet data transmission, a high quality pseudo-synchronous data flow (for example, of the audio type).

The audio encoder module 53 is such as to receive the data read from the buffer 52 (i.e. the input digital audio signal S_MIC_D) and has the function of performing a compression of the output data signal S_D (and hence of the input digital audio signal S_MIC_D) in such a way as to generate an internal output data signal S1_DBB_INT, which carries compressed digital audio data. For example, the compression is performed on the basis of the mp3 format.

The transmission module 54 is such as to receive the internal output data signal S1_DBB_INT and has the function of generating on the first internal output data terminal OP1_INT, based on the internal output data signal S1_DBB_INT, the first baseband output data signal S1_DBB_O, which carries a digital audio signal compressed in the baseband frequencies.

It should be observed that the audio encoder module 53 and the transmission module 54 are realized by means of the digital signal processor, and the buffer 52 is likewise internal to the digital signal processor 9.

Figure 3B:
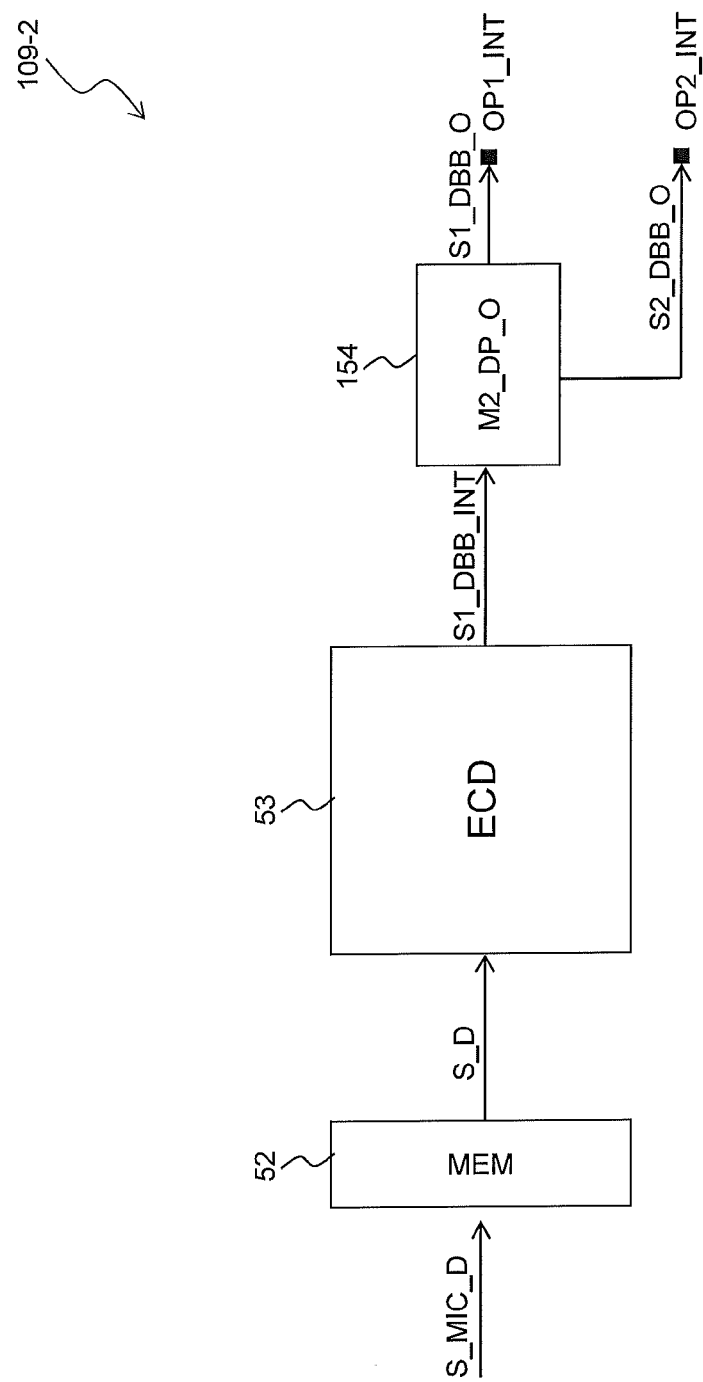
FIG. 3B schematically shows a block diagram of a variant of the transmission module of the electronic device according to the embodiment of the invention.

With reference to FIG. 3B, there is shown a block diagram of the transmission module 109-2 realized in the digital signal processor 9 according to a second variant of the embodiment of the invention.

The transmission module 109-2 in FIG. 3B differs from the transmission module 9-2 in FIG. 3A due to the presence of a second internal output data terminal OP2_INT and a duplication module 154 having the function of duplicating the internal output data signal S1_DBB_INT on the second internal output data terminal OP2_INT. In particular, the duplication module is such as to receive the internal output data signal S1_DBB_INT and is such as to generate, on the first internal output data terminal OP1_INT, the first baseband output data signal S1_DBB_O, which is equal to the internal output data signal S1_DBB_INT, and is such as to generate, on the second internal output data terminal OP2_INT, the second baseband output data signal S2_DBB_O, which is equal to a copy of the internal output data signal S1_DBB_INT.

In this manner, the electronic device 1 according to the second variant of the invention is capable of transmitting the digital audio signal to two electronic devices (analogous to the electronic device 1) connected to it, as will be explained in greater detail below with reference to FIG. 4C.

Figure 4A:
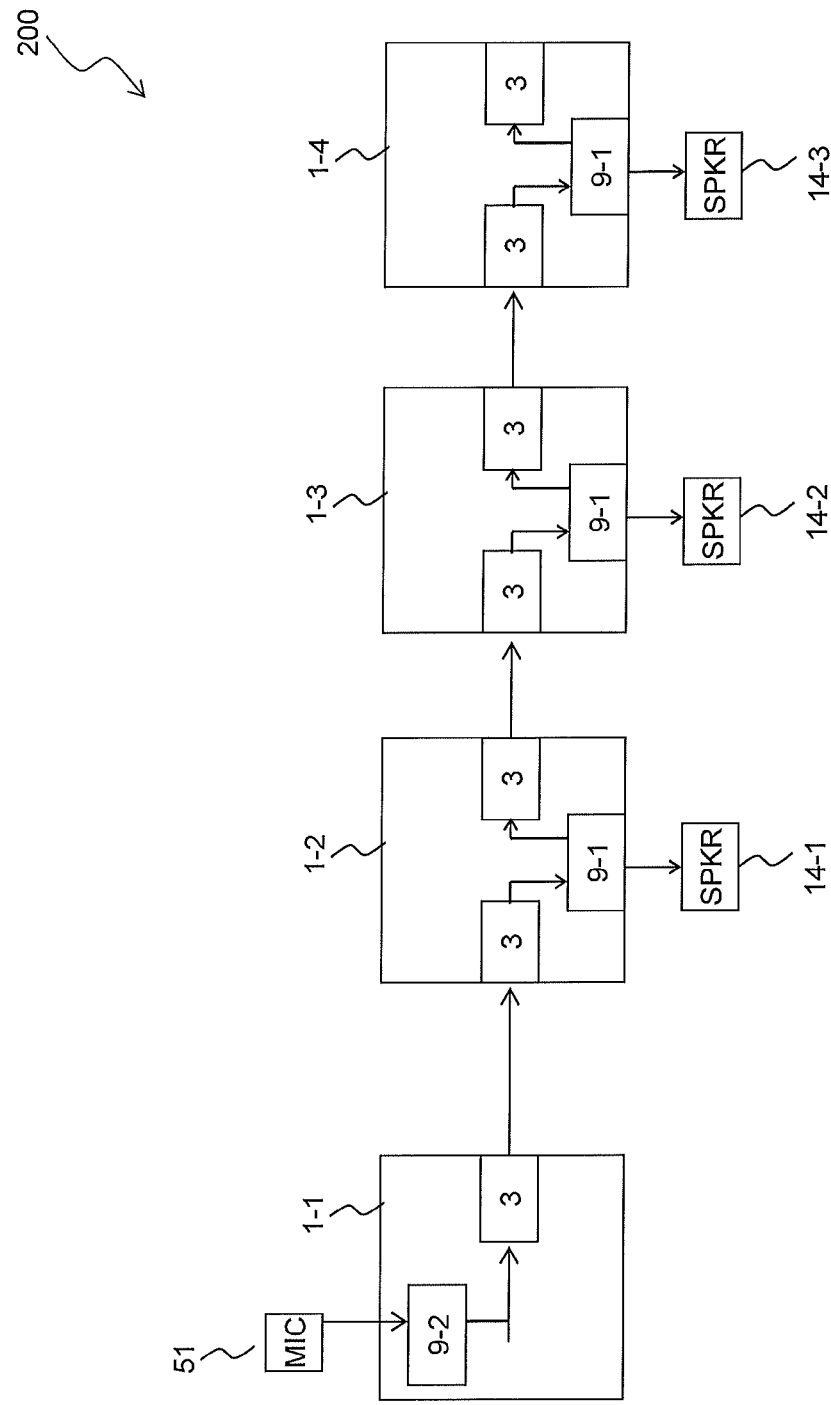
FIGS. 4A-4F schematically show a system for point-to-multipoint transmission of a digital signal over a short-range radio communication network according to the embodiment of the invention, in which different connection schemes are used.

With reference to FIG. 4A, there is shown a system 200 for point-to-multipoint transmission of a digital audio signal over a short-range radio communication network. The system 200 comprises a plurality of electronic devices 1-1, 1-2, 1-3, 1-4, each made like the previously described electronic device 1. In particular, the electronic device 1-1 comprises the transmission module 9-2 shown in FIG. 3A and each of the electronic devices 1-2, 1-3, 1-4 comprises the receiving module 9-1 shown in FIG. 2A. The electronic devices 1-1, 1-2, 1-3, 1-4 are connected via short-range radio communication channels according to a daisy chain scheme.

This scheme makes it possible to achieve:
- unidirectional voice communication between the electronic device 1-1 operating as the transmitting master and the electronic devices 1-2, 1-3, 1-4 operating as receiving slaves;
- unidirectional voice communication between the electronic device 1-2 operating as the transmitting master and the electronic devices 1-1, 1-3, 1-4 operating as receiving slaves;
- unidirectional voice communication between the electronic device 1-3 operating as the transmitting master and the electronic devices 1-1, 1-2, 1-4 operating as receiving slaves;
- unidirectional voice communication between the electronic device 1-4 operating as the transmitting master and the electronic devices 1-1, 1-2, 1-3 operating as receiving slaves.

Therefore, the electronic device 1-2 can be, in different unidirectional voice communications, a receiving slave or a transmitting master. Analogously, the electronic device 1-3 can be, in different unidirectional voice communications, a receiving slave or a transmitting master and the electronic device 1-4 can be, in different unidirectional voice communications, a receiving slave or a transmitting master.

More in general, in a chain scheme comprising a plurality of devices, each of the devices is a transmitting master device relative to the other receiving slave devices connected downstream of said transmitting master device and is a receiving slave device relative to the other transmitting master devices connected upstream of said receiving slave device.

In particular, by means of a suitable protocol for setting up the connection scheme, the electronic device 1-1 is connected with the electronic device 1-2, the electronic device 1-2 is connected with the electronic device 1-3 and the electronic device 1-3 is connected with the electronic device 1-4. For example, in the event that the devices 1-1, 1-2, 1-3, 1-4 are such as to operate according to Bluetooth® specifications, the profile SPP and protocol L2CAP are used.

For example, the electronic devices 1-1, 1-2, 1-3, 1-4 operate on the basis of Bluetooth® specifications and hence the communication channels between adjacent electronic devices are radio communication channels which carry signals that comply with Bluetooth® specifications.

In particular, according to the invention, the data link is realized using Bluetooth® technology with a unidirectional asynchronous connectionless link (ACL) for packet data.

According to the invention, the devices are connected together to form a so-called piconet. The various piconets are in turn connected together in a network topology called scatternet.

The transmission system 200 further comprises a microphone 51 connected to the electronic device 1-1 and comprises speakers 14-1, 14-2, 14-3 connected respectively to the electronic devices 1-2, 1-3, 1-4.

The operation of the electronic devices 1-1, 1-2, 1-3, 1-4 connected according to a chain scheme will be described below.

Let us suppose that the chain connection scheme has already been set up and that the electronic device 1-1 has already been authorized to establish unidirectional point-to-multipoint voice communication with the electronic devices 1-2, 1-3, 1-4. The microphones of the electronic devices 1-2, 1-3, 1-4 are deactivated and the speaker of the electronic device 1-1 is also deactivated.

The microphone 51 generates an analog audio signal based on the person's voice.

The electronic device 1-1 receives the analog audio input signal S_MIC_A, which carries the voice and performs a sampling to convert the input analog audio signal S_MIC_A into the input digital audio signal S_MIC_D.

The transmission module 9-2 of the digital signal processor 9 receives the input digital audio signal S_MIC_D and generates, as a function thereof, the first baseband output data signal S1_DBB_O, as explained previously in the description of FIG. 3A. In particular, the first baseband output data signal S1_DBB_O carries compressed digital audio data (for example, in an mp3 format) in the baseband frequencies.

The transmitter-receiver 3 of the electronic device 1-1 receives the first baseband output data signal S1_DBB_O and generates, as a function thereof, the first radio-frequency output data signal S_DRF_O, as explained previously. In particular, the first radio-frequency output data signal S_DRF_O carries compressed digital audio data (in an mp3 format in the example) modulated at the radio frequencies.

The first radio-frequency output data signal S_DRF_O is transmitted by the antenna of the electronic device 1-1 to the antenna of the electronic device 1-2, via a short-range radio channel (for example, the distance is in the range of between 100 and 1,000 meters).

The transmitter-receiver 3 of the electronic device 1-2 receives the first radio-frequency output data signal S_DRF_O and generates, as a function thereof, the baseband input data signal S_DBB_I, as explained previously.

The receiving module 9-1 of the digital signal processor 9 receives the baseband input data signal S_DBB_I and generates, as a function thereof, the digital audio driving signal S_PL_SPKR_D and the output data signal S1_DBB_O, as explained previously in the description of FIG. 2A. Consequently, the speaker 14-1 connected with the electronic device 1-2 reproduces the voice of the person who had spoken into the microphone 51 of the electronic device 1-1. Moreover, the transmitter-receiver 3 of the electronic device 1-2 receives the first baseband output data signal S1_DBB_O and generates, as a function thereof, the first radio-frequency output data signal S_DRF_O, as explained previously. In particular, the first radio-frequency output data signal S_DRF_O carries compressed digital audio data (in an mp3 format in the example) modulated at the radio frequencies.

The first radio-frequency output data signal S_DRF_O is transmitted by the antenna of the electronic device 1-2 to the antenna of the electronic device 1-3, via a short-range radio channel (for example, the distance is in the range of between 100 and 1,000 meters).

The operation of the electronic device 1-3 is the same as that of the electronic device 1-2 and hence the speaker 14-2 connected with the electronic device 1-3 also reproduces the voice of the person who had spoken into the microphone 51 of the electronic device 1-1.

The operation of the electronic device 1-4 is likewise analogous to that of the electronic device 1-2 and hence the speaker 14-3 connected with the electronic device 1-4 also reproduces the voice of the person who had spoken into the microphone 51 of the electronic device 1-1.

Therefore, unidirectional voice communication between the electronic device 1-1 and the electronic devices 1-2, 1-3, 1-4 has been illustrated. It should be observed that in the event that the devices 1-1, 1-2, 1-3, 1-4 are such as to operate according to Bluetooth® specifications, it will be possible to establish said unidirectional voice communication between an electronic device 1-1 and three electronic devices 1-2, 1-3, 1-4 complying with Bluetooth® specifications for successive electronic devices, until reaching a distance (for example, in the range of between 1,000 and 3,000 meters) greater than the maximum distance (for example, 1000 meters) allowed by Bluetooth® technology. It should be observed, moreover, that, for the sake of simplicity, three receiving electronic devices 1-2, 1-3, 1-4 have been considered, but more in general it is possible to establish unidirectional voice communication with a larger number of receiving devices, for example seven or more, while complying with Bluetooth® specifications.

Advantageously, according to the invention, the unidirectional voice communication via Bluetooth® technology is realized by means of a unidirectional asynchronous connectionless link (ACL) for packet data.

The technical effect is represented by an improved efficiency in the use of the available bandwidth; this enables the electronic device 1 to establish communication with three or more electronic devices (for example, eight or more) analogous to the electronic device 1.

In other words, the technical effect ensured by the envisaged solution is a use of fewer resources necessary for transmission.

In still other words, both the hardware and software resources are optimized, thus guaranteeing sufficient resources to enable audio signals to be transmitted even to many (at least three) devices connected according to the various topologies that will be shown in the course of the present description.

Figure 4B:
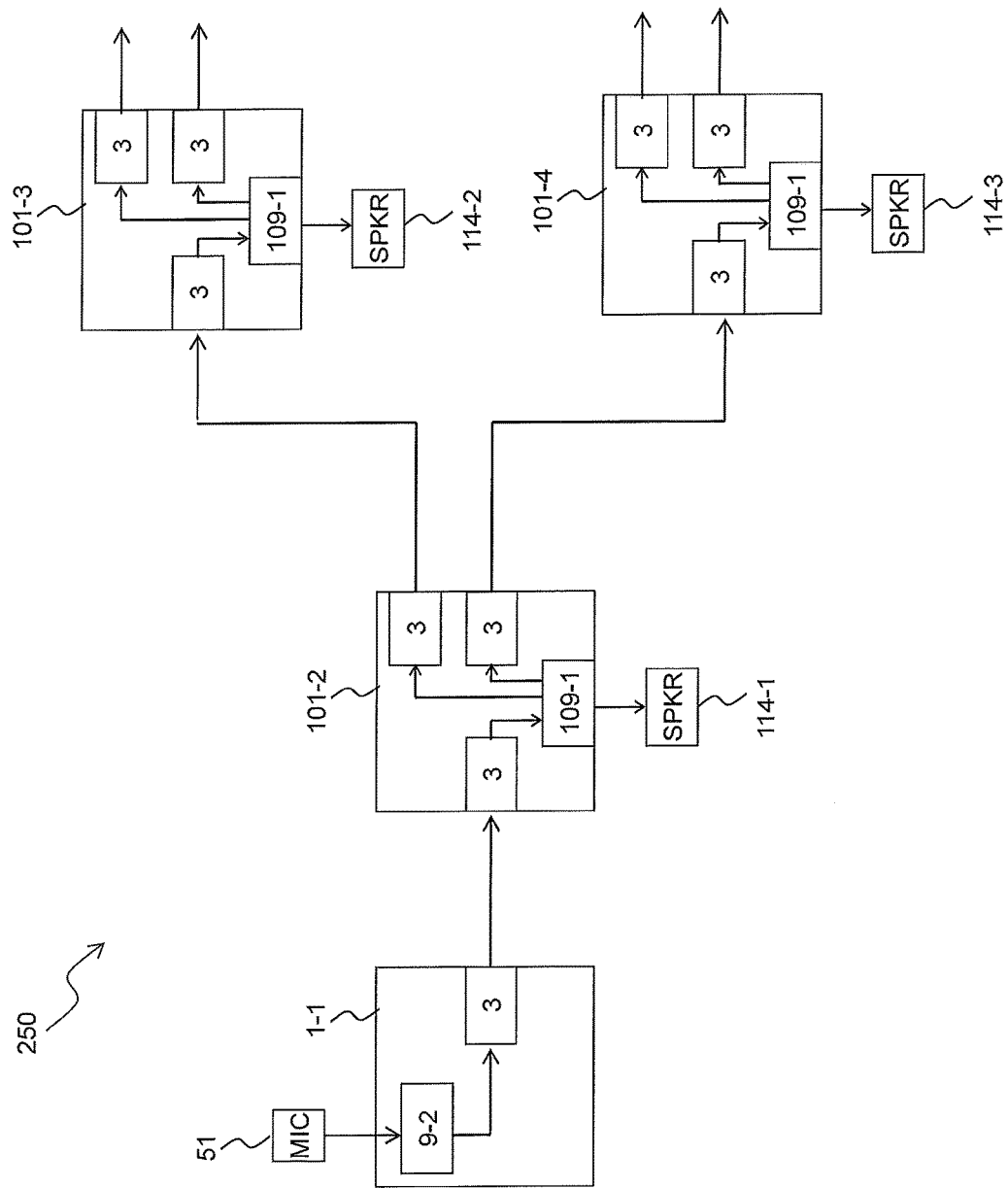

With reference to FIG. 4B, there is shown a system 250 for point-to-multipoint transmission of a digital audio signal over a short-range radio communication network. The system 250 comprises a plurality of electronic devices 1-1, 101-2, 101-3, 101-4, each made like the previously described electronic device 1. In particular, the electronic device 1-1 comprises the transmission module 9-2 shown in FIG. 3A and each of the electronic devices 101-2, 101-3, 101-4 comprises the receiving module 109-1 shown in FIG. 2B.

The system 250 differs from the system 200 in that the electronic devices 1-1, 101-2, 101-3, 101-4 are connected via short-range radio communication channels according to a tree scheme.

This scheme makes it possible to achieve unidirectional voice communication of a static type between the electronic device 1-1 operating as the transmitting master and the electronic devices 101-2, 101-3, 101-4 operating as receiving slaves.

In particular, the system 250 differs from the system 200 in that the electronic device 1-2 of the system 200 is connected, during transmission, with a single electronic device 1-3, whilst the electronic device 101-2 of the system 250 is connected, during transmission, with two electronic devices 101-3 and 101-4: this is possible using the receiving module 109-1 (instead of the receiving module 9-1), wherein the receiving module 109-1 comprises a second internal output data terminal OP2_INT that generates the second baseband output data signal S2_DBB_O.

The transmission system 250 has the advantage (compared to the transmission system 200) of reducing (the number of electronic devices being equal) the number of connections between the electronic devices and hence of reducing the attenuation of the radio signal received from the receiving electronic devices which are farther away from the transmitting electronic device: this enables a larger number of electronic devices to be connected.

Figure 4C:
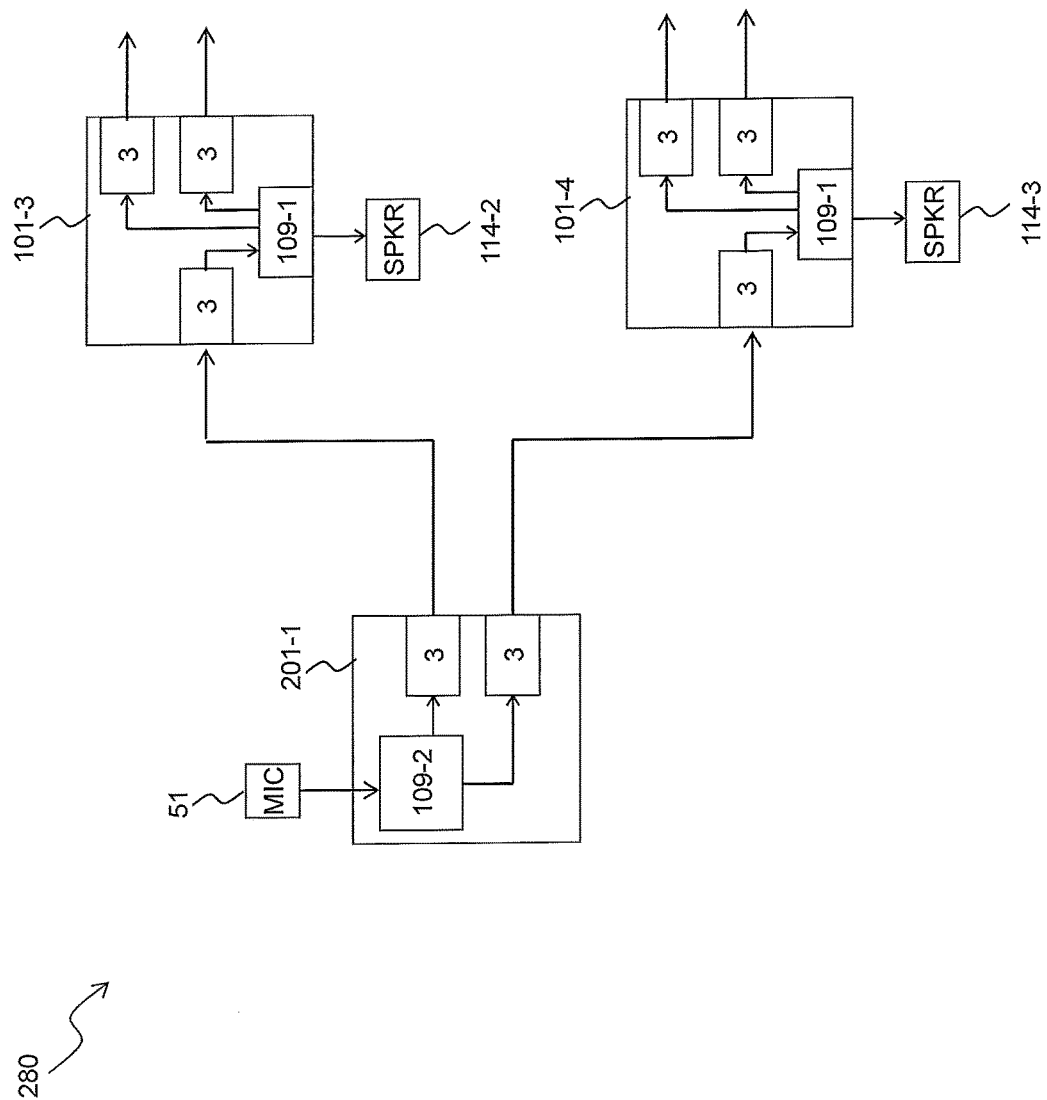

With reference to FIG. 4C, there is shown a system 280 for point-to-multipoint transmission of a digital audio signal over a short-range radio communication network. The system 280 comprises a plurality of electronic devices 201-1, 101-3, 101-4, each made like the previously described electronic device. In particular, the electronic device 201-1 comprises the transmission module 109-2 shown in FIG. 3B and each of the electronic devices 101-3, 101-4 comprises the receiving module 109-1 shown in FIG. 2B. Analogously to FIG. 4B, the electronic devices 201-1, 101-3, 101-4 are connected via short-range radio communication channels according to a tree scheme.

This scheme makes it possible to achieve unidirectional voice communication of a static type between the electronic device 201-1 operating as the transmitting master and the electronic devices 101-3, 101-4 operating as receiving slaves.

In particular, the system 280 differs from the system 250 in that the transmitting electronic device 1-1 of the system 250 is connected, during transmission, with a single electronic device 101-2, whilst the electronic device 201-1 of the system 280 is connected, during transmission, with two electronic devices 101-3 and 101-4: this is possible using the transmission module 109-2 (instead of the transmission module 9-2), wherein the transmission module 109-2 comprises a second internal output data terminal OP2_INT that generates the second baseband output data signal S2_DBB_O. The transmission system 280 has the advantage (compared to the transmission system 250) of further reducing the number of connections between the electronic devices and thus enabling a larger number of electronic devices to be connected.

Figure 4D:
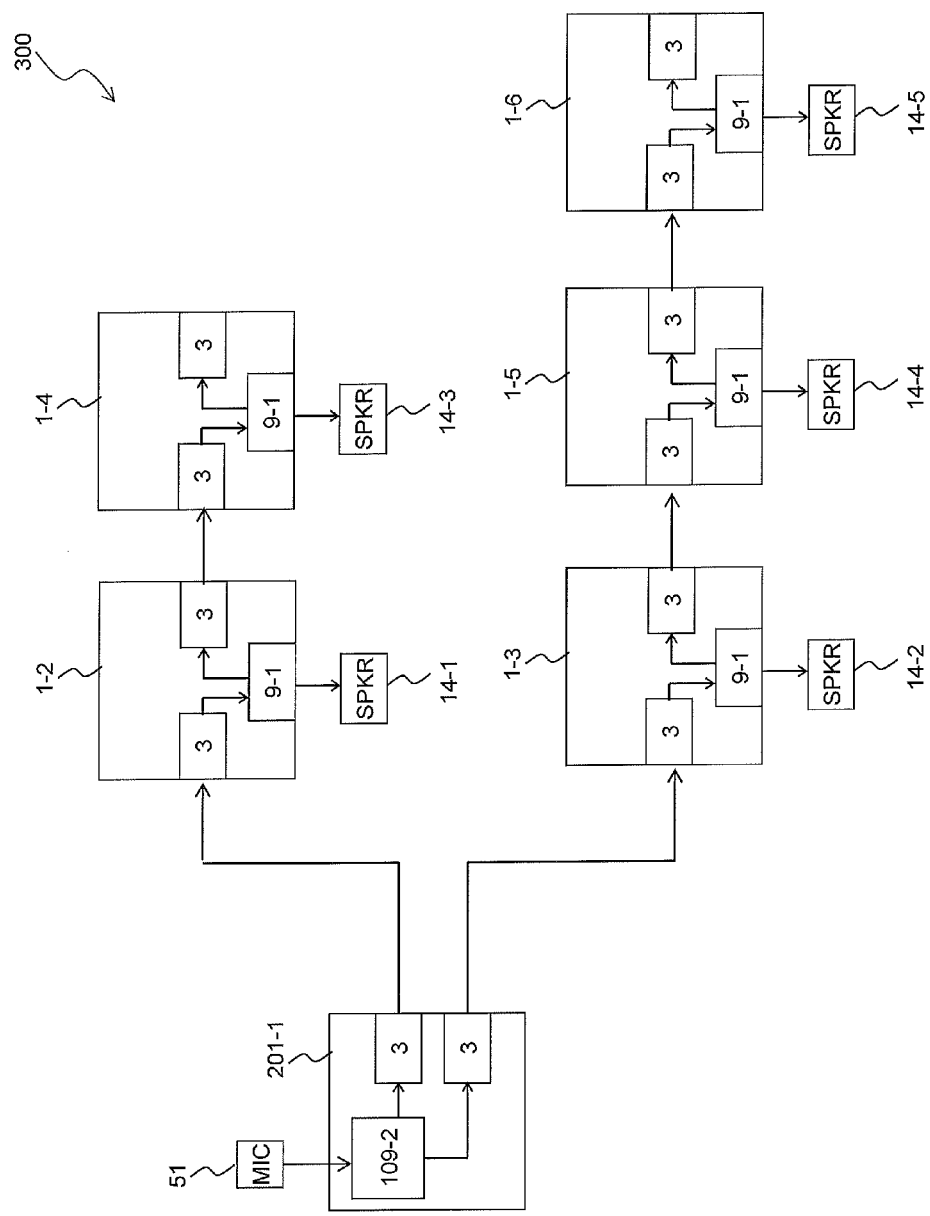

With reference to FIG. 4D, there is shown a system 300 for point-to-multipoint transmission of a digital audio signal over a short-range radio communication network. The system 300 comprises a plurality of electronic devices 201-1, 1-2, 1-3, 1-4, 1-5, 1-6, each made like the previously described electronic device. In particular, the electronic device 201-1 comprises the transmission module 109-2 shown in FIG. 3B and each of the electronic devices 1-2, 1-3, 1-4, 1-5, 1-6 comprises the receiving module 9-1 shown in FIG. 2A.

The electronic devices 201-1, 1-2, 1-3, 1-4, 1-5, 1-6 are connected via short-range radio communication channels according to a mixed tree-and-chain scheme.

This scheme makes it possible to achieve:
unidirectional voice communication between the transmitting electronic device 201-1 operating as the transmitting master and the receiving electronic devices 1-2, 1-3, 1-4, 1-5, 1-6 operating as receiving slaves;
unidirectional voice communication between the electronic device 1-2 operating as the transmitting master and the electronic devices 1-4, 201-1, 1-3, 1-5, 1-6 operating as receiving slaves;
unidirectional voice communication between the electronic device 1-3 operating as the transmitting master and the electronic devices 1-5, 1-6, 201-1, 1-2, 1-4 operating as receiving slaves;
unidirectional voice communication between the electronic device 1-4 operating as the transmitting master and the electronic devices 201-1, 1-2, 1-3, 1-5, 1-6 operating as receiving slaves;
unidirectional voice communication between the electronic device 1-5 operating as the transmitting master and the electronic devices 1-6, 1-3, 201-1, 1-2, 1-4 operating as receiving slaves.

More in general, in a mixed tree-and-chain scheme comprising a plurality of electronic devices, each of the devices in a chain is a transmitting master device relative to the other receiving slave devices connected in the same chain downstream of said transmitting master device and is a receiving slave device relative to the other transmitting master devices connected in the same chain upstream of said receiving slave device.

Figure 4E:
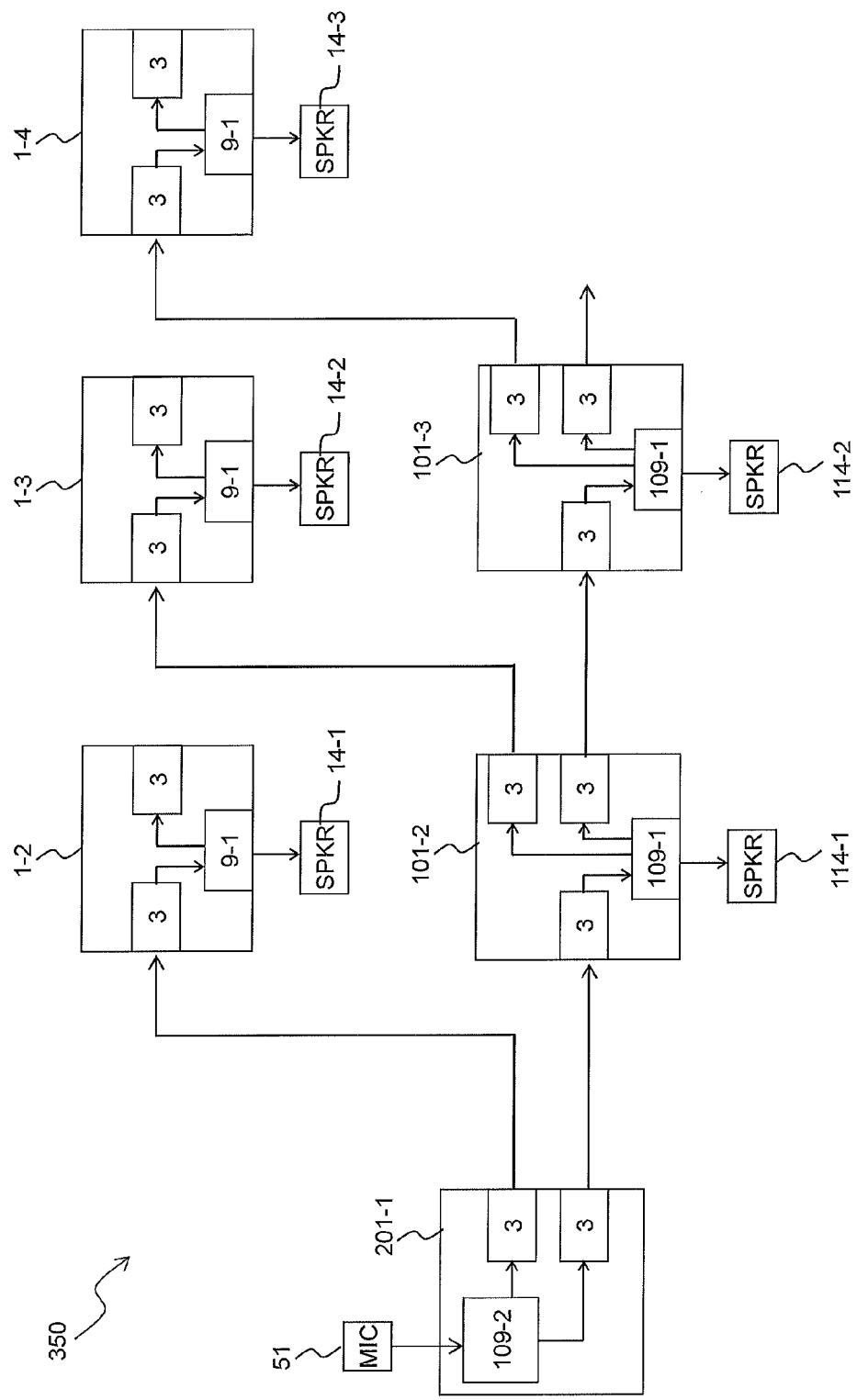

With reference to FIG. 4E, there is shown a system 350 for point-to-multipoint transmission of a digital audio signal over a short-range radio communication network. The system 350 comprises a plurality of electronic devices 201-1, 1-2, 1-3, 1-4, 101-2, 101-3, each made like the previously described electronic device. In particular, the electronic device 201-1 comprises the transmission module 109-2 shown in FIG. 3B, each of the electronic devices 1-2, 1-3, 1-4 comprises the receiving module 9-1 shown in FIG. 2A and each of the electronic devices 101-2, 101-3 comprises the receiving module 109-1 shown in FIG. 2B.

The electronic devices 201-1, 1-2, 1-3, 1-4, 101-2, 101-3 are connected via short-range radio communication channels according to a mixed tree-and-chain scheme.

This scheme makes it possible to achieve unidirectional voice communication of a static type between the electronic device 201-1 operating as the transmitting master and the electronic devices 1-2, 1-3, 1-4, 101-2, 101-3 (connected directly or indirectly) operating as receiving slaves.

More in general, in a mixed tree-and-chain scheme comprising a plurality of electronic devices, each of the devices in a chain is a transmitting master device relative to the other receiving slave devices connected in the same chain downstream of said transmitting master device and is a receiving slave device relative to the other transmitting master devices connected in the same chain upstream of said receiving slave device.

In other words, in a mixed tree-and-chain scheme comprising a plurality of electronic devices, each of the devices in a chain is configured to operate as a transmitting master device relative to the other receiving slave devices connected in the same chain downstream of said transmitting master device and is configured to operate as a receiving slave device relative to the other transmitting master devices connected in the same chain upstream of said receiving slave device.

Figure 4F:
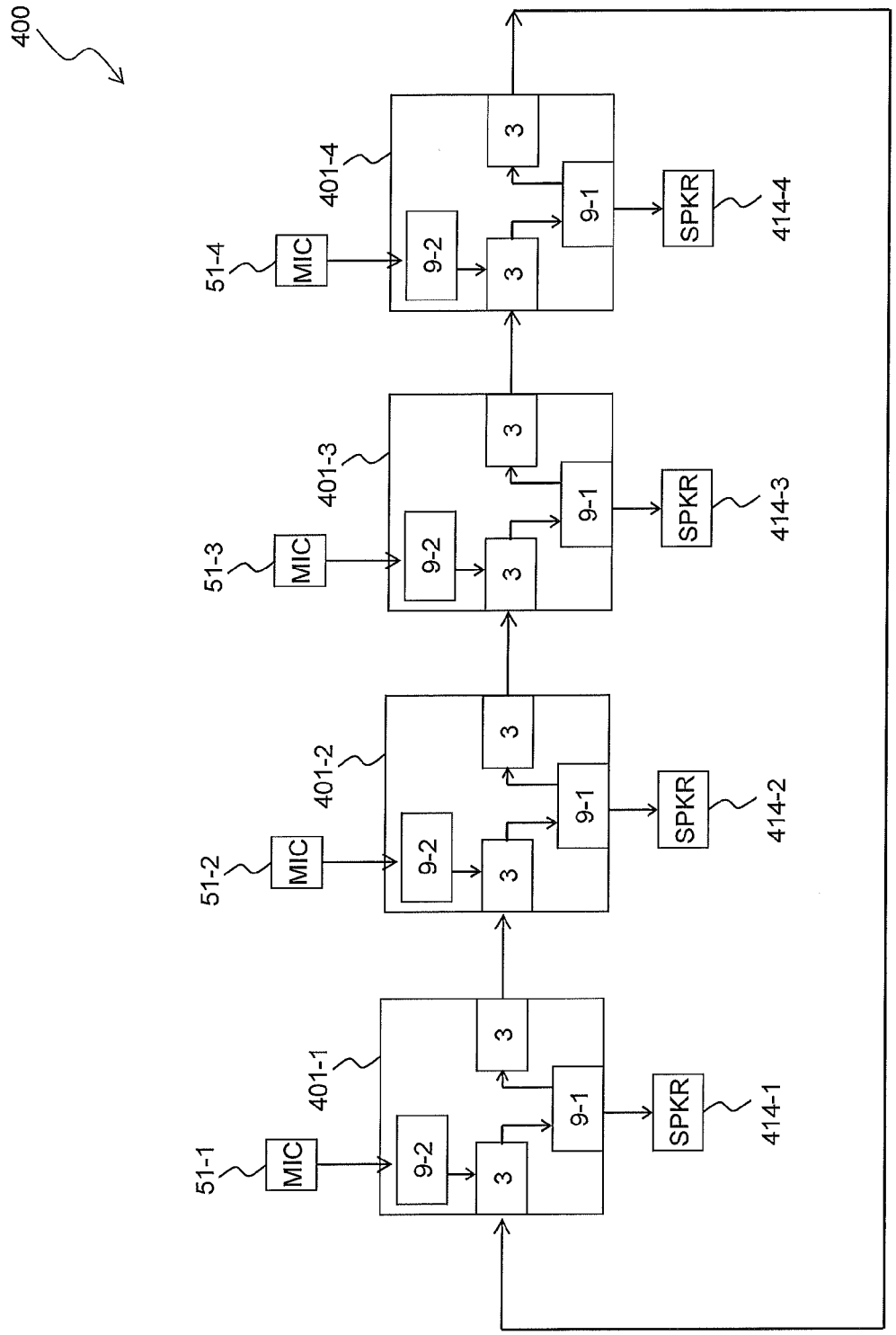

With reference to FIG. 4F, there is shown a system 400 for point-to-multipoint transmission of a digital audio signal over a short-range radio communication network. The system 400 comprises four electronic devices 401-1, 401-2, 401-3, 401-4, each made like the previously described electronic device. In particular, each of the electronic devices 401-1, 401-2, 401-3, 401-4 comprises the transmission module 9-2 shown in FIG. 3A and the receiving module 9-1 shown in FIG. 2A.

The electronic devices 401-1, 401-2, 401-3, 401-4 are connected via short-range radio communication channels by means of a loop scheme.

This scheme makes it possible to achieve unidirectional voice communication between any of the electronic devices 401-1, 401-2, 401-3, 401-4 operating as the transmitting master (for example, the 401-1) and all the other electronic devices 401-1, 401-2, 401-3, 401-4 operating as receiving slaves (for example, 401-1 with 401-2, 401-3, 401-4 or 401-2 with 401-3, 401-4, 401-1).

Therefore, each of the electronic devices 401-1, 401-2, 401-3, 401-4 can be either a transmitting master or a receiving slave in different unidirectional voice communications. In other words, each of the electronic devices 401-1, 401-2, 401-3, 401-4 is configured to be either a transmitting master or a receiving slave in different unidirectional voice communications.

More in general, in a loop connection scheme comprising a plurality of devices, each of the devices in a loop is a transmitting master device relative to the other receiving slave devices connected in the loop downstream of said transmitting master device. Moreover, each of the devices in a loop is a receiving slave device relative to the other transmitting master devices connected in the loop upstream of said receiving slave device.

In other words, in a loop connection scheme comprising a plurality of devices, each of the devices in a loop is configured to operate as a transmitting master device relative to the other receiving slave devices connected in the loop downstream of said transmitting master device. Moreover, each of the devices in a loop is configured to operate as a receiving slave device relative to the other transmitting master devices connected in the loop upstream of said receiving slave device.

Figure 5A:
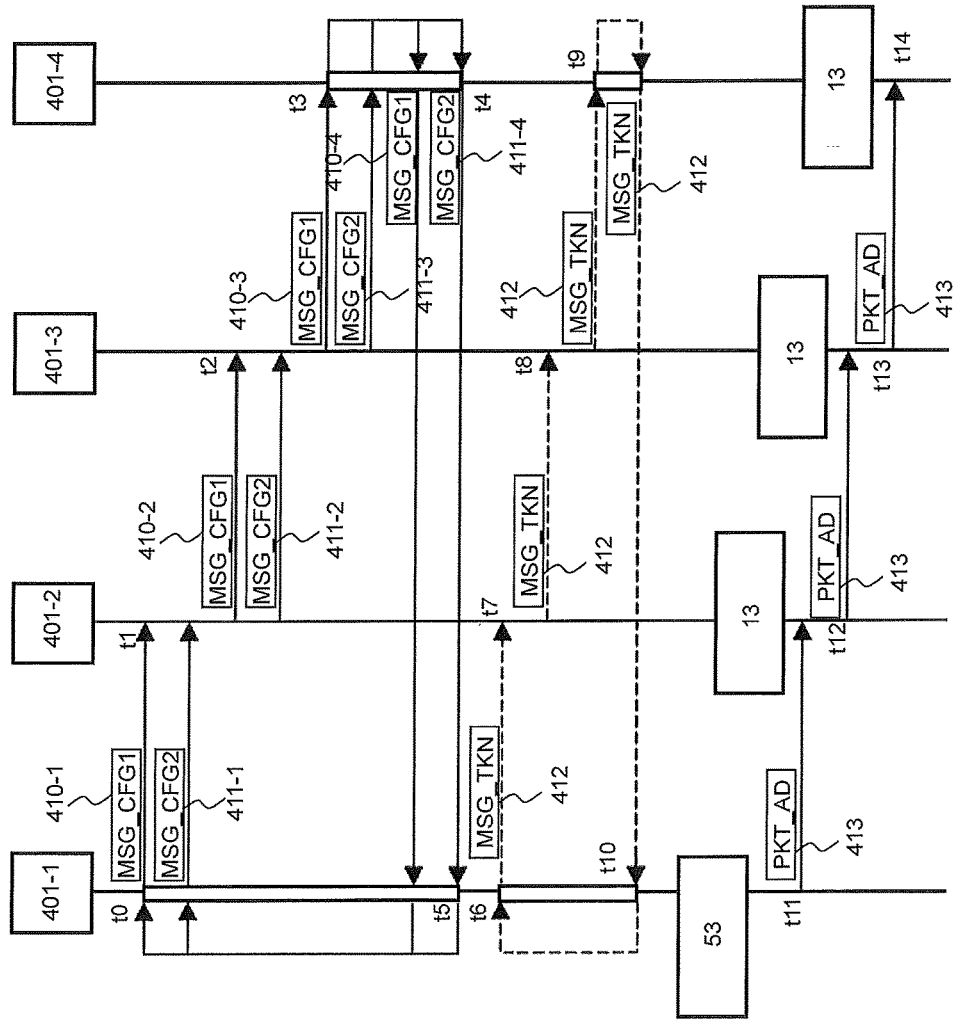
FIGS. 5A-5E schematically show a protocol for setting up a connection scheme and a voice communication reservation protocol implemented in a plurality of electronic devices according to the embodiment of the invention.

With reference to FIG. 5A, there is shown a set-up protocol P1 for setting up a loop connection scheme among the electronic devices 401-1, 401-2, 401-3, 401-4 as shown in FIG. 4F and there is shown a reservation protocol P2 for unidirectional voice communication implemented in the electronic devices 401-1, 401-2, 401-3, 401-4.

The call reservation protocol P2 enables an asynchronous non-connection-oriented data link and unidirectional voice communication to be established between the electronic device 401-1 functioning as a transmitting master and a plurality (in particular, three or more) of electronic devices 401-2, 401-3, 401-4 functioning as receiving slaves. Advantageously, according to the invention, this asynchronous data link, realized by means of Bluetooth® technology, is a unidirectional asynchronous connectionless link (ACL) for packet data.

The voice communication reservation request can be made by a person pressing a button on the electronic device 401-1, or by means of automatic detection of the voice of the person speaking into the microphone 51-1 of the electronic device 401-1.

In other words, the reservation protocol P2 can be activated based on an automatic detection of a voice signal in the electronic device 401-1.

Alternatively, the reservation protocol P2 can be activated by pressing a button on the electronic device 401-1.

The set-up protocol P1, according to the invention, will now be described.

Let us suppose that the electronic devices 401-1, 401-2, 401-3, 401-4 are such as to operate according to Bluetooth® specifications.

At the initial time t0, the set-up protocol P1 of the connection scheme of the electronic devices 401-1, 401-2, 401-3, 401-4 begins.

At time t0 the electronic device 401-1 transmits a first configuration message 410 and a second configuration message 411. In particular, in the case of operation according to Bluetooth® specifications, the first configuration message 410 complies with the protocol L2CAP and the second configuration message 411 complies with the profile SPP.

At time t1 the electronic device 401-2 receives the first configuration message 410 and the second configuration message 411 from the electronic device 401-1 and transmits the first configuration message 410 and the second configuration message 411.

Analogously, at time t2 the electronic device 401-3 receives the first configuration message 410 and the second configuration message 411 from the electronic device 401-2 and transmits the first configuration message 410 and the second configuration message 411.

At time t3 the electronic device 401-4 receives the first configuration message 410 and the second configuration message 411 from the electronic device 401-3 and at time t4 it transmits the first configuration message 410 and the second configuration message 411.

At time t5 the electronic device 401-1 (which is connected via radio with the electronic device 401-4) receives the first configuration message 410 and the second configuration message 411 from the electronic device 401-4, detects that they are equal to the first configuration message 410 and second configuration message 411 initially transmitted and thus at time t5 concludes the loop scheme set-up protocol, i.e. the electronic devices 401-1, 401-2, 401-3, 401-4 are connected in a loop, as shown in FIG. 4F.

At time t6 the voice call reservation protocol begins.

At time t6 the electronic device 401-1 transmits a call reservation message 412 indicative of a request to reserve a voice call.

At time t7 the electronic device 401-2 receives the call reservation message 412 and forwards it.

Analogously, at time t8 the electronic device 401-3 receives the call reservation message 412 and forwards it.

At time t9 the electronic device 401-4 receives the call reservation message 412 and transmits it.

At time t10 the electronic device 401-1 (which is connected via radio with the electronic device 401-4) receives the call reservation message 412, detects that is equal to the initially transmitted call reservation message 412 and thus at time t10 concludes the call reservation protocol, i.e. the electronic device 401-1 has been authorized to make a voice call to the electronic devices 401-2, 401-3, 401-4.

At time t11 transmission of the digital audio signal from the electronic device 401-1 begins, the device 401-1 functioning as a master transmitting to the electronic devices 401-2, 401-3, 401-4, which are in turn functioning as receiving slaves.

At time t11 the electronic device 401-1 transmits a data packet 413 which carries digital audio data.

At time t12 the electronic device 401-2 performs the following operations:
  it receives the data packet 413 from the electronic device 401-1 and processes it, as explained previously with reference to FIG. 2A;
  it reproduces, based on the data packet 413, a voice signal on the speaker 414-2, as explained previously with reference to FIG. 2A;
  it forwards the data packet 413, as explained previously with reference to FIG. 2A.

Analogously, at time t13 the electronic device 401-3 performs the following operations:
  it receives the data packet 413 from the electronic device 401-2 and processes it, as explained previously with reference to FIG. 2A;

it reproduces, based on the data packet 413, a voice signal on the speaker 414-3, as explained previously with reference to FIG. 2A;

it forwards the data packet 413, as explained previously with reference to FIG. 2A.

At time t14 the electronic device 401-4 performs the following operations:

it receives the data packet 413 from the electronic device 401-3 and processes it, as explained previously with reference to FIG. 2A;

it reproduces, based on the data packet 413, a voice signal on the speaker 414-3, as explained previously with reference to FIG. 2A.

In this manner, point-to-multipoint voice communication has taken place between the electronic device 401-1 functioning as transmitting master and the electronic devices 401-2, 401-3, 401-4 functioning as receiving slaves.

It should be observed that, for the sake of simplicity, only one data packet 413 transmitted from the electronic device 401-1 to the electronic devices 401-2, 401-3, 401-4 has been considered, but more generally speaking a plurality of data packets (analogous to data packet 413) can be transmitted from the electronic device 401-1 to electronic devices 401-2, 401-3, 401-4 at instants of time after t14.

Advantageously, according to the invention, point-to-multipoint voice communication has been achieved in compliance with Bluetooth® specifications.

Advantageously, according to the invention, the data link realized using Bluetooth® technology is a unidirectional asynchronous connectionless link (ACL) for packet data.

The technical effect ensured by the asynchronous connectionless link (ACL) is a use of fewer resources necessary for transmission.

In other words, both the hardware and software resources are optimized, thus guaranteeing sufficient resources to enable audio signals to be transmitted even to many (at least three) devices connected according to the various topologies shown.

It should be observed that the same considerations regarding the electronic device 401-1 in FIG. 5A can be analogously applied to the other electronic devices 401-2, 401-3, 401-4 in FIG. 5A functioning as transmitting masters. In this case, each of the electronic devices 401-2, 401-3, 401-4 can establish, alternatively, unidirectional voice communication with the other electronic devices in the loop.

Figure 5B:
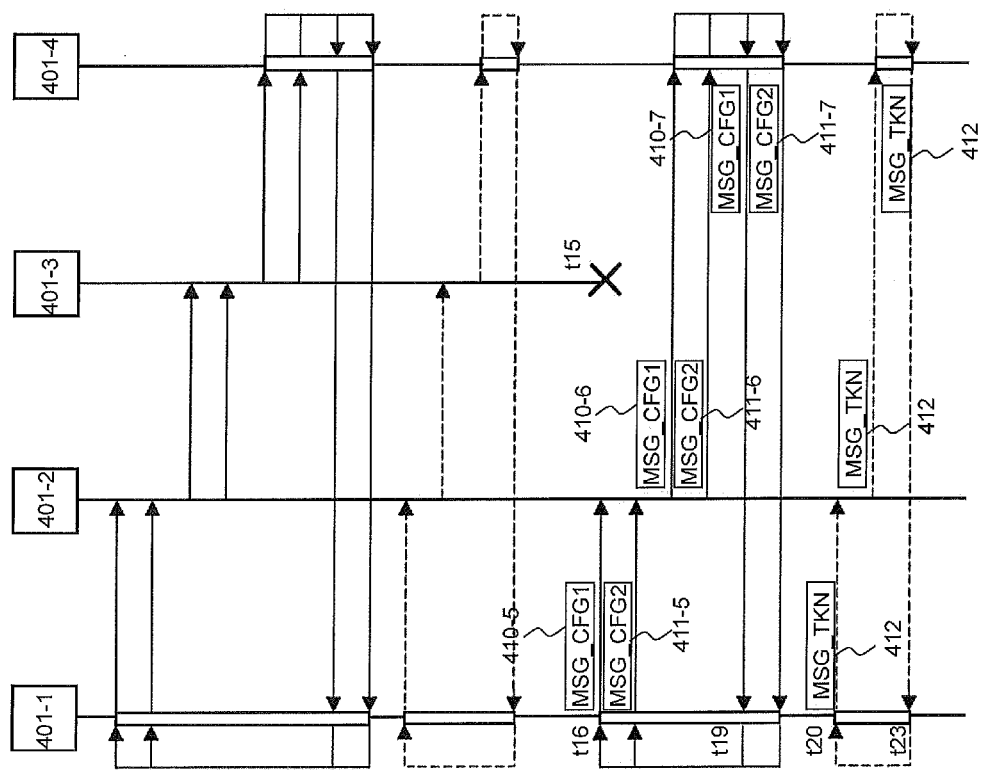

With reference to FIG. 5B, there is shown the reconfiguration time sequence for the reservation protocol P1 of the unidirectional voice communication implemented in the electronic devices 401-1, 401-2, 401-3, 401-4 connected according to the loop scheme in FIG. 4F, in the case in which the electronic device 401-3 exits from the loop at time t15. It is possible to observe that the communication between the electronic device 401-1 functioning as a transmitting master and the receiving electronic devices 401-2, 401-4 functioning as receiving slaves is recovered starting from time t16. In particular, between the times t16 and t19 messages of the protocol for setting up the connection scheme of the electronic devices 401-1, 401-2, 401-4 are exchanged in a manner that is analogous to what was previously explained for the times between t0 and t5: in this manner, a loop connection is established among the electronic devices 401-1, 401-2, 401-4. Moreover, between the times t20 and t23, messages of the call reservation protocol are exchanged among the electronic devices 401-1, 401-2, 401-4 in a manner that is analogous to what was previously explained for the times between t6 and t10: in this manner, the electronic device 401-1 has been again authorized to make a voice call to the electronic devices 401-2, 401-4.

Figure 5C:
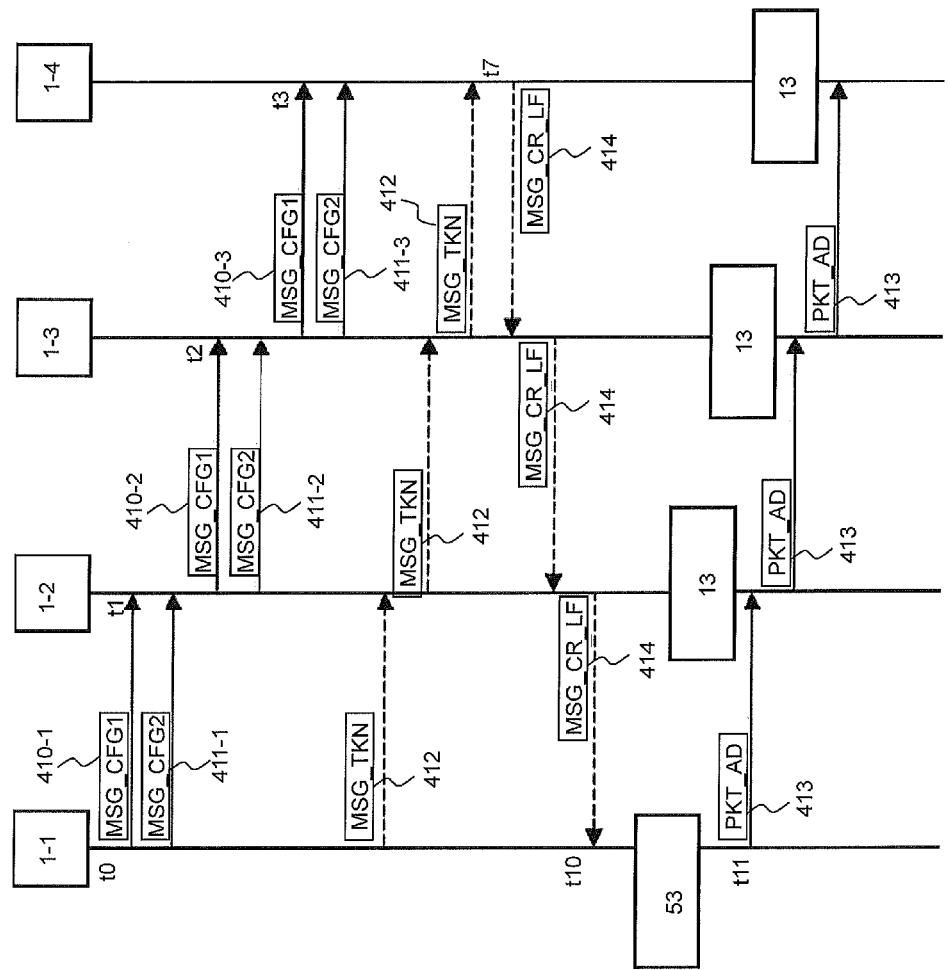

With reference to FIG. 5C, there is shown a set-up protocol for setting up the chain connection scheme among the electronic devices 1-1, 1-2, 1-3, 1-4 as shown in FIG. 4A and there is shown a reservation protocol of unidirectional voice communication implemented in the electronic devices 1-1, 1-2, 1-3, 1-4. The call reservation protocol enables an asynchronous non-connection-oriented data link and unidirectional voice communication to be established between the electronic device 1-1 functioning as transmitting master and a plurality (in particular, three or more) of electronic devices 1-2, 1-3, 1-4 functioning as receiving slaves.

The voice communication reservation request can be made by a person pressing a button on the electronic device 1-1 or by means of automatic detection of the voice of the person speaking into the microphone 51 of the electronic device 1-1.

The protocol in FIG. 5C differs from that in FIG. 5A in that the electronic device 1-4 is not connected via radio with the electronic device 1-1 and thus the electronic device 1-1 cannot receive response messages directly from the electronic device 1-4. Consequently, at time t7 the electronic device 1-4 receives the call reservation message 412 indicative of a voice call reservation request and transmits a reservation acknowledge message 414. The reservation acknowledge message 414 is received by the electronic devices 1-3 and 1-2 and is forwarded until being received by the electronic device 1-1 at time t10, when the call reservation protocol is concluded: the electronic device 1-1 has thus been authorized to make a voice call to the electronic devices 1-2, 1-3, 1-4.

Figure 5D:
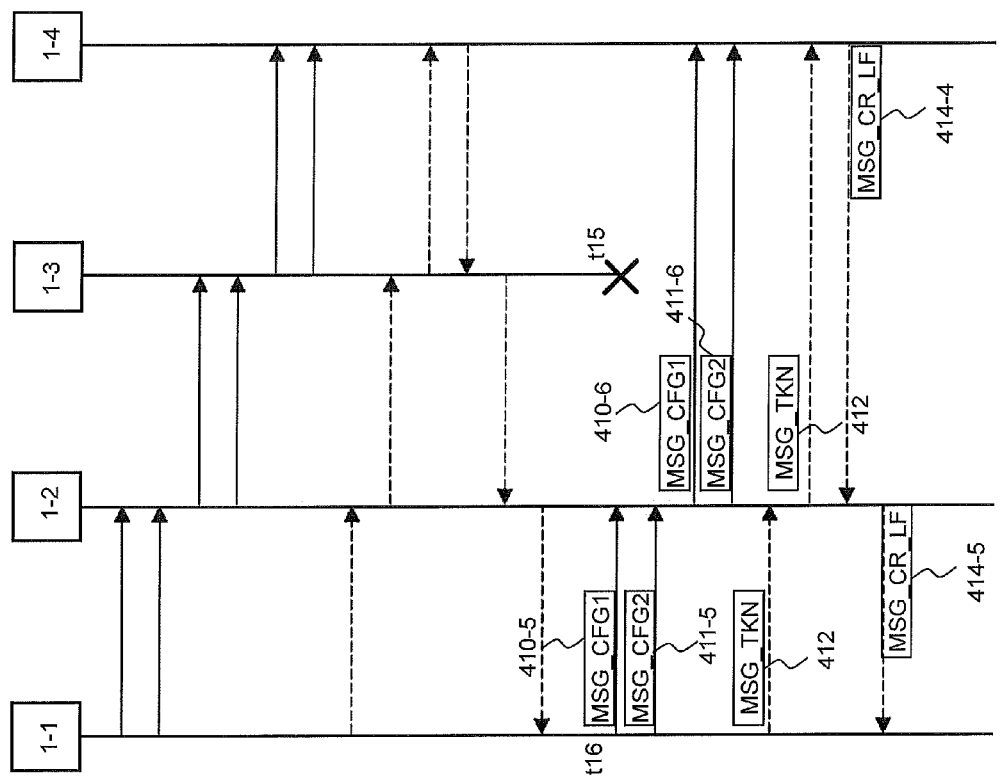

With reference to FIG. 5D, there is shown the reconfiguration time sequence for the reservation protocol of the unidirectional voice communication implemented in the electronic devices 1-1, 1-2, 1-3, 1-4 connected with the chain scheme of FIG. 4A, in the case in which the electronic device 1-3 exits from the loop at time t15. It is possible to observe that in this case as well, the communication between the electronic device 1-1 functioning as a transmitting master and the remaining electronic devices 1-2, 1-4 functioning as receiving slaves is recovered starting from time t16.

Figure 5E:
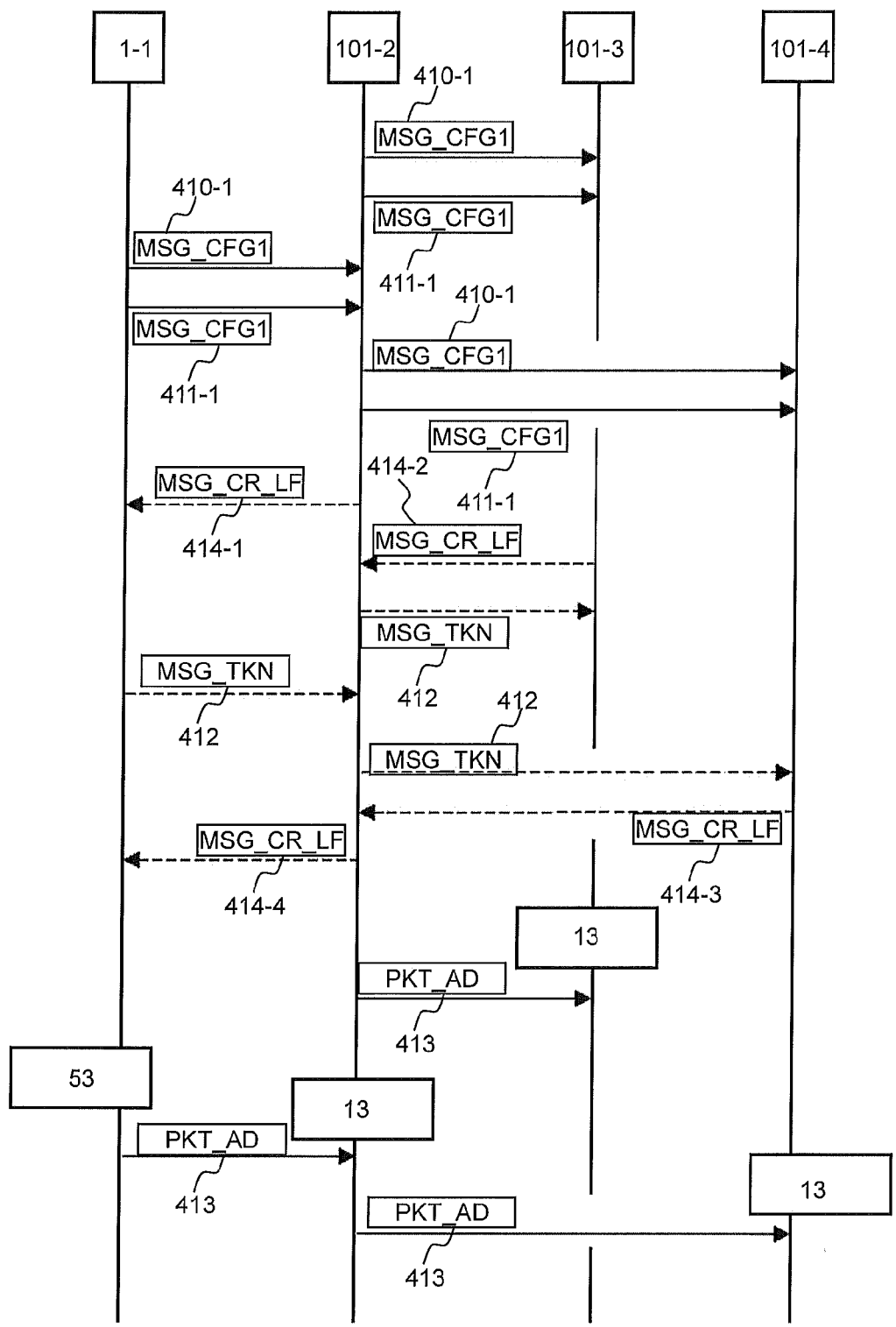
Figure 6:
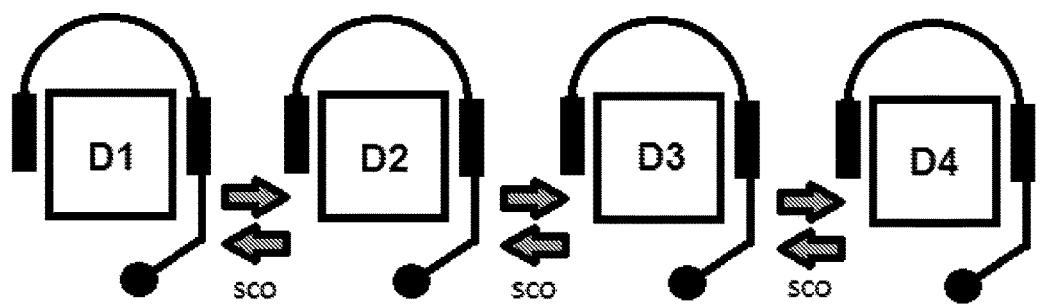
FIG. 6 schematically shows four devices connected in a chain via an SCO link.

With reference to FIG. 5E, there is shown a set-up protocol for setting up the tree connection scheme among the electronic devices 1-1, 101-2, 101-3, 101-4 as shown in FIG. 4B and there is shown a reservation protocol of unidirectional voice communication implemented in the electronic devices 1-1, 101-2, 101-3, 101-4. The call reservation protocol enables an asynchronous non-connection-oriented data link and unidirectional voice communication to be established between the electronic device 1-1 functioning as a transmitting master and a plurality (in particular, three or more) of electronic devices 101-2, 101-3, 101-4 functioning as receiving slaves.

Advantageously, according to the invention, the data link is realized using Bluetooth® asynchronous connectionless (ACL) technology.

The technical effect ensured by the asynchronous connectionless link (ACL) is a use of fewer resources necessary for transmission The voice communication reservation request can be made by a person pressing a button on the electronic device 1-1 or by means of automatic detection of the voice of the person speaking into the microphone 51 of the electronic device 1-1.

The messages of the protocol for setting up the tree connection scheme and the reservation protocol of the unidirectional voice communication are analogous to those explained in the preceding FIG. 5C.

The subject matter of the present invention also relates to a protective helmet for users of vehicles comprising an interphone according to the invention.

The subject matter of the present invention also relates to a method for point-to-multipoint transmission of a digital signal over a radio communication network.

The method comprises the following steps:

a) receiving a radio-frequency input digital signal and generating therefrom a baseband digital signal;

b) receiving the baseband digital signal and performing a duplication of the baseband digital signal into a duplicated baseband input digital signal;

c) storing the received baseband digital signal and the duplicated baseband input digital signal in an input buffer and output buffer, respectively;

d) reading the digital signal from the input buffer, processing the digital signal read from the input buffer and generating therefrom a digital driving signal;

e) reading the digital signal from the output buffer and generating therefrom a duplicated baseband output digital signal;

f) receiving the duplicated baseband output digital signal and generating therefrom a radio-frequency output digital signal;

g) receiving the digital driving signal and generating therefrom a second driving signal for driving an audio distribution device and/or an image and/or data display device;

h) implementing a reservation protocol for unidirectional audio and/or data communication;

i) receiving the radio-frequency input digital audio signal according to Bluetooth® specifications;

j) transmitting the radio-frequency output digital audio signal according to Bluetooth® specifications;

k) realizing, by means of said microcontroller, a unidirectional asynchronous packet data link.

Preferably, the method of point-to-multipoint transmission further comprises the following steps:

l) receiving the input digital audio signal and storing it in a buffer;

m) reading the input digital audio signal from the buffer, processing the input digital audio signal read from the buffer and performing a duplication of the input digital audio signal read from the buffer into a duplicated output digital audio signal;

n) receiving the duplicated output digital audio signal and generating therefrom the radio-frequency output digital signal.

The present invention relates to a method implemented by means of a computer for point-to-multipoint transmission of a digital signal over a radio communication network.

The method is configured for the implementation of one or more of the steps a) to n) described above.

The present invention relates to a program for an electronic processor comprising a software code suitable for executing one or more of steps a) to n) when said program is run on an electronic processor.

The invention claimed is:

1. An electronic device for point-to-multipoint transmission of a digital signal over a radio communication network, the electronic device comprising:

a transmitter-receiver (3) configured to receive a radio-frequency input digital signal (S_DRF_I) and generate therefrom a baseband digital signal (S_DBB_I);

a digital signal processor (9) comprising a receiving module (9-1), an input buffer (12), an audio decoder module (13) and an output buffer (15), the receiving module being configured to:

receive the baseband digital signal and perform a duplication (11) of the baseband digital signal into a duplicated baseband input digital signal (S_DD2);

store the received baseband digital signal (S_DD1) and the duplicated baseband input digital signal (S_DD2) in the input buffer (12) and in the output buffer (15), respectively;

read the received baseband digital signal from the input buffer (12), perform a decompression on the received baseband digital signal (S DD1), process the received baseband digital signal read from the input buffer (12) and generate therefrom a digital driving signal (S_PL_SPKR_D);

read the duplicated baseband input digital signal from the output buffer (15) and generate therefrom a duplicated baseband output digital signal (S1_DBB_O);

wherein the transmitter-receiver (3) is further configured to receive the duplicated baseband output digital signal (S1 DBB 0) and generate therefrom a radio-frequency output digital signal (S_DRF_O), the electronic device further comprising:

an audio distribution device and/or an image and/or data display device;

an input/output interface (7) configured to receive the digital driving signal and generate therefrom a second driving signal (S_PL_SPKR_A) for driving the audio distribution device and/or the image and/or data display device;

a microcontroller (4) configured to implement a reservation protocol for unidirectional audio and/or data communication;

wherein the transmitter-receiver is configured to receive the radio-frequency input digital signal (S_DRF_I) on the basis of Bluetooth® technology and to transmit the radio-frequency output digital signal (S_DRF_O) on the basis of Bluetooth® technology, and wherein the microcontroller (4) is configured to realize a unidirectional asynchronous packet data link.

2. The electronic device according to claim 1, wherein said unidirectional asynchronous packet data link is realized using Bluetooth® technology with an asynchronous connectionless link ACL.

3. The electronic device according to claim 1, further comprising an audio source configured to generate an input digital audio signal (S_MIC_D), wherein the digital signal processor comprises a transmission module (109-2) and a buffer (52), the transmission module being configured to:

receive the input digital audio signal (S_MIC_D) and store it in the buffer (52);

read the input digital audio signal from the buffer, process the input digital audio signal read from the buffer and perform a duplication of the input digital audio signal read from the buffer into a duplicated output digital signal (S2_DBB_O), wherein the transmitter-receiver is further configured to receive the duplicated output digital signal and generate therefrom the radio-frequency output digital signal (S_DRF_O).

4. The electronic device according to claim 3, wherein the processing of the receiving module (9-1) comprises said decompression of the received baseband digital signal read from the input buffer into the digital driving signal according to a decompression algorithm,
and wherein the processing of the transmission module comprises:
a compression (53) of the input digital audio signal read from the buffer (52) into a compressed output digital audio signal (S1_DBB_INT) according to a compression algorithm that is opposite to said decompression algorithm;
duplication (154) of the compressed output digital audio signal into a duplicated compressed output digital audio signal (S2_DBB_O);
wherein the transmitter-receiver is further configured to receive the duplicated compressed output digital audio signal and generate therefrom the radio-frequency output digital signal (S_DRF_O).

5. The electronic device according to claim 4, wherein the receiving module (9-1) is further configured to receive the duplicated baseband input digital signal and perform a further duplication of the duplicated baseband input digital signal into a further duplicated baseband input digital signal (S2_DBB_O),
wherein the transmitter-receiver is further configured to receive the further duplicated baseband input digital signal and generate therefrom the radio-frequency output digital signal (S_DRF_O).

6. The electronic device according to claim 1, wherein the microcontroller is configured to:
transmit (t6) a call reservation message (412);
receive (t10) said call reservation message or a reservation acknowledge message (414);
activate (t11) said unidirectional audio and/or data communication.

7. An interphone comprising the electronic device according to claim 1.

8. A point-to-multipoint radio transmission system (200, 250, 280, 300, 350, 400) comprising:
a first electronic device (1-1) according to claim 1, configured to operate as a transmitting master to transmit a first radio-frequency output digital signal;
at least a second electronic device (1-2) according to claim 1, configured to operate as a receiving slave to:
receive the first radio-frequency output digital signal and generate, as a function thereof, the digital driving signal;
transmit a second radio-frequency output digital signal generated as a function of the first radio-frequency output digital signal;
at least a third electronic device (1-3) according to claim 1, configured to operate as a receiving slave for receiving the second radio-frequency output digital signal and generate, as a function thereof, the digital driving signal;
wherein the microcontrollers (4) of the first, second and third electronic devices are configured to:
implement a protocol (P1) to set up a connection scheme between said first (1-1) electronic device and at least one of said second (1-2) and third (1-3) electronic devices;
implement a reservation protocol (P2) of unidirectional voice communication between the first electronic device (1-1) and at least one of said second (1-2) and third (1-3) electronic devices;
establish said unidirectional voice communication between the first electronic device (1-1) and at least one of said second (1-2) and third (1-3) electronic devices by means of an asynchronous packet data transmission.

9. A point-to-multipoint transmission system comprising first, second, and third electronic devices according to the electronic device of claim 1, wherein the second electronic device is configured to operate as a transmitting master and the first and third electronic devices are configured to operate as receiving slaves.

10. The point-to-multipoint transmission system according to claim 8, wherein said asynchronous packet data transmission is realized using Bluetooth® technology with an asynchronous connectionless link (ACL).

11. A point-to-multipoint transmission system (200, 250, 280, 300, 350, 400) comprising first, second, and third electronic devices according to claim 1, wherein said first, second and third electronic devices are connected by means of a connection scheme selected from among the following: chain (200); loop (400); tree (250, 280); mixed tree and chain (300, 350).

12. The point-to-multipoint transmission system according to claim 11, wherein said chain connection scheme (200) comprises said first, second, and third devices, and wherein each of said first, second, and third devices is configured to operate as:
a transmitting master device relative to other receiving slave devices connected downstream of said transmitting master device, and
a receiving slave device relative to other transmitting master devices connected upstream of said receiving slave device.

13. The point-to-multipoint transmission system according to claim 12, wherein said chain connection scheme (200) comprises a microphone (51) connected to said first electronic device and speakers (14-1, 14-2, 14-3) connected to said second and third electronic devices, respectively.

14. The point-to-multipoint transmission system according to claim 11, wherein said mixed tree-and-chain connection scheme comprises a plurality of electronic devices, and wherein each of the devices in a chain is configured to operate as:
a transmitting master device relative to other receiving slave devices connected in the same chain downstream of said transmitting master device, and
a receiving slave device relative to other transmitting master devices connected in the same chain upstream of said receiving slave device.

15. A point-to-multipoint transmission system (400) comprising a plurality of electronic devices according to the electronic device of claim 1, wherein a loop scheme is configured so as to realize the unidirectional voice communication between:
any one of the plurality of electronic devices operating as a transmitting master and;
all of the other of the plurality of electronic devices operating as receiving slaves.

16. The system (400) according to claim 15, wherein each of said plurality of electronic devices is configured to be either the transmitting master or the receiving slave in different unidirectional voice communications.

17. The system (400) according to claim 15, wherein said loop connection scheme comprises the plurality of electronic devices, and wherein each of the electronic devices in a loop is configured to operate as:

the transmitting master relative to the receiving slaves connected in the loop downstream of said transmitting master;
the receiving slave relative to other transmitting masters connected in the loop upstream of said receiving slaves.

18. A point-to-multipoint radio transmission system, comprising:
a first, a second, a third, and a fourth electronic device (401-1, 401-2, 401-3, 401-4), according to the electronic device of claim 1,
the first electronic device (401-1) being configured to operate as a transmitting master to transmit a first radio-frequency output digital signal;
the second electronic device (401-2) being configured to operate as the receiving slave to:
receive the first radio-frequency output digital signal and generate, as a function thereof, the digital driving signal; and
transmit a second radio-frequency output digital signal generated as a function of the first radio-frequency output digital signal,
the third electronic device (401-3) being configured to operate as the receiving slave to:
receive the second radio-frequency output digital signal and generate, as a function thereof, the digital driving signal; and
transmit a third radio-frequency output digital signal generated as a function of the first radio-frequency output digital signal,
the fourth electronic device (401-4) being configured to operate as the receiving slave for receiving the third radio-frequency output digital signal, and generate, as a function thereof, the digital driving signal,
wherein the microcontrollers of the first, second, third and fourth electronic devices are configured to:
implement a protocol (P1) to set up a connection scheme between said first (401-1) electronic device and at least one of said second (401-2), third (401-3) and and fourth (401-1) electronic devices,
implement a reservation protocol (P2) of unidirectional voice communication between the first electronic device (401-1) and at least one of said second (401-2), third (401-3) and fourth (401-4) electronic devices,
establish said unidirectional voice communication between the first electronic device (1-1) and at least one of said second (401-2), third (401-3) and fourth (401-4) electronic devices by means of an asynchronous packet data transmission;
the first electronic device (401-1) transmitting, at time t0, a first configuration message (410) and a second configuration message (411);
the second electronic device (401-2) receiving, at time t1, the first configuration message (410) and the second configuration message (411) and transmitting the first configuration message (410) and the second configuration message (411);
the third electronic device (401-3) receiving, at time t2, the first configuration message (410) and the second configuration message (411) from the second electronic device (401-2) and transmitting the first configuration message (410) and the second configuration message (411);
the fourth electronic device (401-4) receiving, at time t3, the first configuration message (410) and the second configuration message (411) from the third electronic device (401-3);

the fourth electronic device (401-4) transmitting, at time t4, the first configuration message (410) and the second configuration message (411);
the first electronic device 401-1 to receive, via radio connection at time t5, the first configuration message (410) and the second configuration message (411) from the fourth electronic device (401-4), to detect that the first configuration message (410) and second configuration message (411) received at time t5 are respectively equal to the first configuration message (410) and to the second configuration message (411) initially transmitted and to close the connection scheme set-up protocol.

19. The system according to claim 18, wherein said connection scheme is a connection scheme in which the first, second, third and fourth electronic devices (401-1, 401-2, 401-3, 401-4) are connected in a loop.

20. A point-to-multipoint transmission system comprising:
a first, a second, a third and a fourth electronic device (401-1, 401-2, 401-3, 401-4), according to the electronic device of claim 1,
the first electronic device (401-1) being configured to operate as the transmitting master to transmit a first radio-frequency output digital signal,
the second electronic device (401-2) being configured to operate as the receiving slave to:
receive the first radio-frequency output digital signal and generate, as a function thereof, the digital driving signal; and
transmit a second radio-frequency output digital signal generated as a function of the first radio-frequency output digital signal,
the third electronic device (401-3) being configured to operate as the receiving slave to:
receive the second radio-frequency output digital signal and generate, as a function thereof, the digital driving signal; and
transmit a third radio-frequency output digital signal generated as a function of the first radio-frequency output digital signal,
the fourth electronic device (401-4) being configured to operate as the receiving slave for receiving the third radio-frequency output digital signal, and generate, as a function thereof, the digital driving signal;
wherein the microcontrollers of the first, second, third and fourth electronic devices are configured to:
implement a protocol (P1) to set up a connection scheme between said first (401-1) electronic device and at least one of said second (401-2), third (401-3) and fourth (401-4) electronic devices;
implement a reservation protocol (P2) of unidirectional voice communication between the first electronic device (401-1) and at least one of said second (401-2), third (401-3) and fourth (401-4) electronic devices; and
establish said unidirectional voice communication between the first electronic device (1-1) and at least one of said second (401-2), third (401-3) and fourth (401-4) electronic devices by means of an asynchronous packet data transmission;
wherein when operating under said protocol (P2),
the first electronic device (401-1) transmits, at time t6, a call reservation message (412) indicative of a voice call reservation request;
the second electronic device (401-2) receives and forwards, at time t7, the call reservation message (412);

the third electronic device (401-3) receives and forwards, at time t8, the call reservation message (412);

the fourth electronic device (401-4) receives and transmits, at time t9, the call reservation message (412);

the first electronic device (401-1) via radio with the fourth electronic device (401-4) receives, at time t10, the call reservation message (412), and detects that the call reservation message received at time t10 is equal to the initially transmitted call reservation message (412);

wherein at time t10, when the call reservation protocol is concluding, the first electronic device (401-1) is authorized to make a voice call to the electronic devices (401-2, 401-3, 401-4).

\* \* \* \* \*